US012447847B2

(12) United States Patent
Ehrenhalt

(10) Patent No.: US 12,447,847 B2
(45) Date of Patent: Oct. 21, 2025

(54) ROBOTIC CHARGING SYSTEM AND METHOD

(71) Applicant: EV Safe Charge Inc., Los Angeles, CA (US)

(72) Inventor: Caradoc Ehrenhalt, Beverly Hills, CA (US)

(73) Assignee: EV Safe Charge Inc., Los Angeles, CA (US)

( * ) Notice: Subject to any disclaimer, the term of this patent is extended or adjusted under 35 U.S.C. 154(b) by 719 days.

(21) Appl. No.: 17/625,504

(22) PCT Filed: Jul. 10, 2020

(86) PCT No.: PCT/US2020/041553
§ 371 (c)(1),
(2) Date: Jan. 7, 2022

(87) PCT Pub. No.: WO2021/007496
PCT Pub. Date: Jan. 14, 2021

(65) Prior Publication Data
US 2022/0258632 A1 Aug. 18, 2022

Related U.S. Application Data

(60) Provisional application No. 62/872,605, filed on Jul. 10, 2019.

(51) Int. Cl.
*B60L 53/38* (2019.01)
*B60L 53/126* (2019.01)
(Continued)

(52) U.S. Cl.
CPC ............. *B60L 53/38* (2019.02); *B60L 53/126* (2019.02); *B60L 53/14* (2019.02); *B60L 53/18* (2019.02);
(Continued)

(58) Field of Classification Search
CPC ...... B60L 53/38; B60L 53/126; B60L 53/305; B60L 53/37; B60L 53/53; B60L 53/65; B60L 53/665
See application file for complete search history.

(56) References Cited

U.S. PATENT DOCUMENTS 9,592,742 B1 3/2017 Sosinov et al.
10,011,181 B2* 7/2018 Dudar ...................... H04B 5/79
(Continued)

FOREIGN PATENT DOCUMENTS

CN 102956063 A 3/2013
CN 105584380 A 5/2016
(Continued)

OTHER PUBLICATIONS

Machine translation of CN-107336623-A (Year: 2024).*
(Continued)

*Primary Examiner* — David V Henze-Gongola
(74) *Attorney, Agent, or Firm* — Knobbe Martens Olson & Bear LLP

(57) ABSTRACT

The present disclosure relates to a robotic charging system that provides a charge as a service for charging electric vehicles. The robotic charging system can be deployed and managed by a cloud solution in response to user requests to charge a vehicle. The robotic charging system can be autonomous such that it receives a target location and navigates to the target location autonomously. A cloud solution can track, manage, monitor, and deploy robotic charging systems in response to requests submitted by a mobile application.

21 Claims, 17 Drawing Sheets

(51) Int. Cl.
　　　B60L 53/14　　　(2019.01)
　　　B60L 53/18　　　(2019.01)
　　　B60L 53/30　　　(2019.01)
　　　B60L 53/37　　　(2019.01)
　　　B60L 53/53　　　(2019.01)
　　　B60L 53/65　　　(2019.01)
　　　B60L 53/66　　　(2019.01)

(52) U.S. Cl.
　　　CPC ............ *B60L 53/305* (2019.02); *B60L 53/37* (2019.02); *B60L 53/53* (2019.02); *B60L 53/65* (2019.02); *B60L 53/665* (2019.02)

(56) References Cited

U.S. PATENT DOCUMENTS

| | | | |
|---|---|---|---|
| 10,099,566 | B2 | 10/2018 | Wu et al. |
| 2013/0300362 | A1 | 11/2013 | Turner |
| 2016/0101701 | A1* | 4/2016 | Wu ............... B60L 53/38 320/108 |
| 2016/0368464 | A1* | 12/2016 | Hassounah ............ B60L 53/80 |
| 2019/0009679 | A1* | 1/2019 | Gaither ................. B60L 53/68 |
| 2019/0135125 | A1 | 5/2019 | Sponheimer et al. |

FOREIGN PATENT DOCUMENTS

| | | | | |
|---|---|---|---|---|
| CN | 106166959 | A | | 11/2016 |
| CN | 107336623 | A | * | 11/2017 |
| CN | 107921882 | A | | 4/2018 |
| CN | 109466361 | A | | 3/2019 |
| EP | 2439099 | A2 | | 4/2012 |
| EP | 3546278 | A1 | * | 10/2019 ............ B60L 53/12 |
| JP | 2000092622 | | | 3/2000 |
| KR | 20110080308 | A | | 7/2011 |
| KR | 20130085115 | | | 7/2013 |
| KR | 20160004603 | | | 1/2016 |
| KR | 20160134283 | | | 11/2016 |
| WO | WO 2018/130223 | A1 | | 7/2018 |

OTHER PUBLICATIONS

Office Action issued in Chinese Application No. 202080062702.6, dated Oct. 10, 2023.
Extended European Search Report issued in corresponding European Patent Office Application No. 20837555.0, dated Jan. 23, 2024.
International Search Report and Written Opinion issued in Corresponding PCT Application No. PCT/US2020/041553, dated Oct. 29, 2020.
"Mobile Robot Experiment Tutorials", Yifan Zhao, et al., pp. 129-131, Yunnan University Press, May 2014.
"Practical Photography", Qilin Yu, et al., p. 117, Communication University of ChinaPress, Jan. 2014.
Office Action issued in Chinese Application No. 202080062702.6, dated Nov. 5, 2024.
Office Action issued in Chinese Application No. 202080062702.6, dated Sep. 12, 2024.
Office Action issued in Chinese Application No. 202080062702.6, dated Jun. 12, 2024.

* cited by examiner

ROBOTIC CHARGING SYSTEM AND METHOD

CROSS REFERENCE

This application is a national phase application under 35 U.S.C. § 371 of International Application No. PCT/US2020/041553, filed Jul. 10, 2020, which claims the benefit of U.S. Provisional Patent Application No. 62/872,605, filed on Jul. 10, 2019, the entire disclosure of which is incorporated by referenced herein.

BACKGROUND

More and more regulatory mandates require installation of a certain number of electric vehicle ("EV") charging spaces. Without mandates, an increasing number of EV drivers require EV charging at home, at work, at the mall, and on the go. An ever-growing number of site owners desire to provide EV charging to employees, tenants and customers. EV charging infrastructure installation is often expensive and time consuming in existing buildings, including multi-unit dwellings, new construction, office buildings, and across parking lot levels. EV chargers are often installed far away from electrical rooms. Further, running conduit and setting up chargers takes time and can be very expensive, often requiring trenching and drilling through concrete. Additionally, dedicated EV parking spaces mean that if no EV utilizes the spaces, non-EV parking patrons cannot use those EV charging parking spaces. If additional dedicated EV charging parking spaces are needed, adding more capacity is a time-consuming and expensive proposition and cannot be possible due to lack of adequate power at the site. Many existing buildings lack the power requirements to make EV charging possible. Finally, many disadvantaged communities do not have the onsite power necessary in locations where EV charging is desired. As more and more vehicles of all types switch from internal combustion engines to electric propulsion systems powered by batteries, charging is needed for all EVs, including cars, trucks, motorcycles, boats, airplanes, and the like.

More and more urban mobility devices such as ebikes and scooters need charging. Adding a charging method to existing infrastructure in urban and other areas is often expensive and time consuming.

In addition, there is a need for mobile charging for a myriad of devices including a mobile battery solution for battery-to-grid power and a solution allowing vehicle-to-grid power and power management.

Accordingly, it would be beneficial to provide a robotic charging technology which effectively addresses one or more of the previously described issues.

BRIEF DESCRIPTION OF THE DRAWINGS

Other systems, methods, features, and advantages will be or will become apparent to one with skill in the art upon examination of the following figures and detailed description. It is intended that all such additional systems, methods, features, and advantages be included within this description, be within the scope, and be protected by the accompanying claims. Component parts shown in the drawings are not necessarily to scale and can be exaggerated to better illustrate the important features. In the drawings, like reference numerals designate like parts throughout the different views.

DETAILED DESCRIPTION

Figure 1:
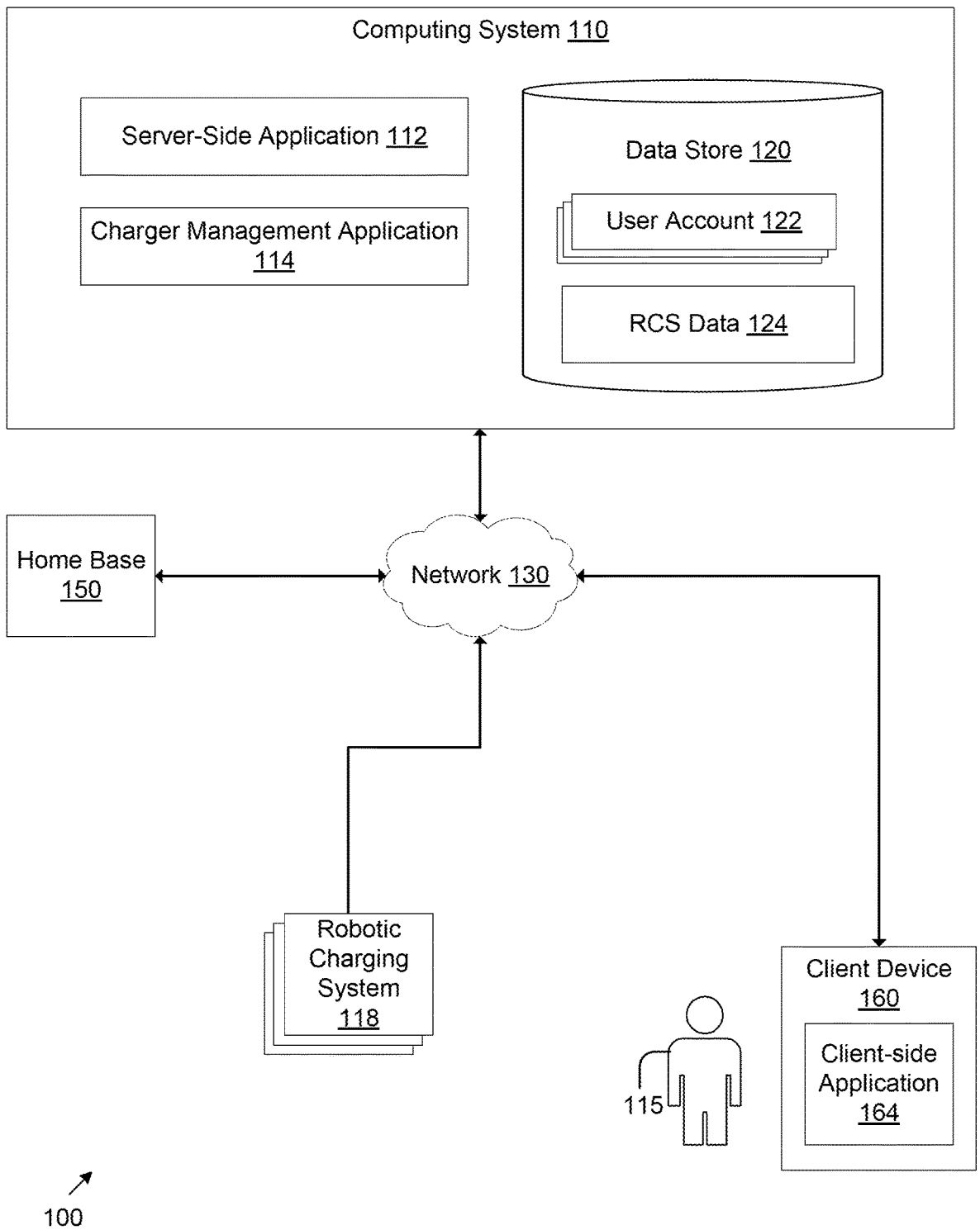
FIG. 1 illustrates a networked environment 100 to manage and deploy mobile charging according to various embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In some embodiments, the robotic charging system and method is a robotic charging solution with multiple flexible features that enable customers to implement the Charging as a Service approach in their business model. In some embodiments, the flexible sensor suite and modularity in the charging connection mechanism can enable it to be configured for semi-autonomous or fully autonomous use, depending on the needs of the customer and the robotic charging system being charged. In some embodiments, the flexibility of the packaging of the robotic charging system can enable it to be used in a variety of environments including one or more of the following: parking lots, garages, bodies of water, delivered over air, and the like.

FIG. 1 shows a networked environment 100 according to various embodiments. The networked environment 100 includes a computing system 110 that can execute application programs and store various data. The computing system 110 can be implemented as a server installation or any other system providing computing capability. Alternatively, the computing system 110 can employ a plurality of computing devices that can be arranged, for example, in one or more server banks or computer banks or other arrangements. Such computing devices can be located in a single installation or can be distributed among many different geographical locations. For example, the computing system 110 can include a plurality of computing devices that together can comprise a hosted computing resource, a grid computing resource, and/or any other distributed computing arrangement. In some embodiments, the computing system 110 can correspond to an elastic computing resource where the allotted capacity of processing, network, storage, or other computing-related resources can vary over time. The computing system 110 can implement one or more virtual machines that use the resources of the computing system 110 to execute server-side applications.

The computing system 110 can include a server-side application 112 and a charger management application 114. The server-side application 112 provides back-end services that allow users 115 to interact with robotic charging systems 118. For example, the server-side application 112 provides a cloud solution to allow users to schedule, track, monitor, and manage mobile charging services provided by a robotic charging system 118. The server-side application 112 can generate web documents (e.g., Hypertext Markup Language (HTML) documents, Extensible Markup Language (XML)) and send them to client devices for rendering and displaying a user interface at a client device.

The charger management application 114 can control, track, monitor, and manage mobile charging services when they are not providing services to users 115. For example, the charger management application 114 can generate instructions to control robotic charging system 118 and direct them to a home base 150. The charger management application 114 can obtain battery levels from various robotic charging systems 118 and direct them to power supplies when battery levels are low. The charger management application 114 can also obtain operation status of robotic charging systems 118 to determine whether any robotic charging systems 118 are damaged and in need of repair. The charger management application 114 can dispatch service vehicles to pick up, collect, repair, re-charge, or service any robotic charging systems 118.

The computing system 110 can include a data store 120. The data store 120 can store data, files, executable code, libraries, application programming interfaces (APIs), and other data/executables to allow the application programs of the computing system 110 to execute. For example, the application programs of the computing system 110 can read data from the data store, write data to the data store 120, update, delete, or otherwise manipulate data in the data store 120.

The data store 120 can store user accounts 122. Each user 115 can have a user account 122 managed by the computing system 110. A user account stores a user's login credentials (e.g., user name, password, etc.), a user's preferences, a user's contact information, usage history, billing information, and potentially other data pertaining to a user and their use of charging services. For example, a user account 122 is used to authenticate a user.

The data store can also store robotic charging system (RCS) data 124. In some embodiments, RCS data 124 can include information about each robotic charging system 118 within the networked environment 100. For example, for a given robotic charging system 118, the RCS data 124 can include a unique robotic charging system identifier, the battery level of the robotic charging system 118, an operational status of the robotic charging system (e.g., online, offline, damaged, operational, moving, charging, etc.), or other information about the robotic charging system 118.

In some embodiments, the computing system 110 is coupled to a network 130. The network 130 can include networks such as the Internet, intranets, extranets, wide area networks (WANs), local area networks (LANs), wired networks, wireless networks, or other suitable networks, etc., or any combination of two or more such networks. The computing system 110 can communicate with a plurality of robotic charging systems 118 over the network.

In some embodiments, a robotic charging system 118 can be a mobile charging apparatus. Some embodiments can include components that allow the robotic charging system 118 to move, navigate, charge electric vehicles, and return to a pick-up location or home base. The robotic charging system 118 is described in more detail with respect to the remaining figures.

In some embodiments, a home base 150 is coupled to the network 130. In some embodiments, the home base can include a warehouse to hold robotic charging systems 118 for purposes of repairing, servicing, and recharging them. The home base 150 can include docks for each robotic charging system 118. A dock can provide power to a docked robotic charging system 118 to recharge the battery of the robotic charging system 118. In some embodiments, the home base 150 can include a communication module that reports the status of each dock. The status can include whether the dock is occupied.

In some embodiments, one or more client devices 160 are also coupled to the network 130. A client device 160 can be a personal computing device, laptop, mobile device, smart phone, tablet, desktop, or other client device. The client device 160 can include a client-side application 164 such as a browser or dedicated mobile application to communicate with the computing system 110. The computing system 110 can receive requests from the client device 160 and generate responses using a communication protocol such as, for example, Hyper Text Transport Protocol (HTTP). In some embodiments, the client device 160 is operated by a user 115 who can choose how to use the services provided by a robotic charging system 118. The client can input requests into the client device 160. The clients-side application 164 can communicate with a server-side application 112 over the network in a client-server arrangement.

In some embodiments, the client-side application 164 includes games and provides prizes. In some embodiments, the client-side application 164 can recognize the user 115 by accessing a camera of the client device 160 or camera attached to the robotic charging system 118. For example, the client-side application 164 or server-side application 112 can perform facial recognition processes to identify the user 115.

In some embodiments, the client-side application 164 can provide shops that are nearby. For example, the server-side application 112 can use one or more APIs to access third party data including the location of vendors, merchants, events, promotions, commercial offers along with information pertaining to their offerings. The server-side application 112 can transmit this data to the client-side application 164 based on the user's location, user profile, or other information pertaining to the user 115.

The following is a description of the operation of the components and data processed in the networked environment 100 in accordance with some embodiments. In some embodiments, the networked environment 100 provides a Charging as a Service approach that can bring significant benefits to users 115 who wish to charge electric vehicles, to site owners, to cities, and to communities worldwide. In some embodiments, the Charging as a Service approach can be easy to install, deploy, and can be scalable. This can involve establishing home bases 150 at various geographic locations to house, store, repair, service, and recharge robotic charging systems 118. In some embodiments, the client-server arrangement allows users 115 to download a client-side application 164 (e.g., a mobile app) onto their client device 160 to gain access to Charging as a Service. In some embodiments, EV user pricing can be pay-as-you-charge, flat-rate, or what the site owner desires. In some embodiments, pricing can be provided in advance by the client-side application 164 or by other apps or information sources. Billing information can be stored in a user account 122 for the user 115. A user can submit a request to charge an electric vehicle using the client-side application 164. The request can include a target location indicating the location of the electric vehicle. In response, the server-side application 112 can receive the request and deploy a robotic charging system 118. In some embodiments, the robotic charging system 118 can automatically navigate to the target location. The user 115 can then couple the robotic charging system 118 to the electric vehicle using a plug. The robotic charging system 118 can then begin charging the vehicle.

In some embodiments, the start-to-finish charging process is controlled by the user 115 through the client-side application 164. For example, the robotic charging system 118 can upload a charging status to the client-side application 164 directly (e.g., via a peer-to-peer connection) or through the server-side application 112 (e.g., in a cloud configuration). In some embodiments, the charging status can indicate an estimated time of completion to charge, a remaining amount of time to complete, a target charge level, an amount of kilowatt-hour (kWh) that has been provided to the electric vehicle by the robotic charging system 118, an indication that the charging is in progress, an indication that charging is complete, an indication that the charging is interrupted, etc. In some embodiments, a user can control the robotic charging system 118 via the client-side application 164 by sending control instructions to perform one or more commands. For example, the client-side application 164 can transmit a command to stop charging, a command to begin charging, a command to pause charging, etc.

In some embodiments, in a pay-as-you-charge billing arrangement, the user can be automatically billed based on the charging service being complete. For example, the server-side application 112 can generate a bill based on the amount of charge provided to the electric vehicle. In some embodiments, the server-side application 112 can use an API to execute an auto-bill pay operation using billing information stored in the user account. In some embodiments, one low, per-unit monthly price includes all maintenance.

In some embodiments, a benefit of the Charging as a Service approach can allow a user 115 to pull into a parking garage and utilize any parking space, regardless of whether all marked (traditional) electric vehicle charging parking spaces are taken. In some embodiments, the user 115 will need to ensure their charging port is located on an accessible side of the parking space. In some embodiments, the robotic charging system 118 can navigate directly to the user 115 or electric vehicle. Some embodiments include being operated fully autonomously, or controlled by remote control with operator assistance, or a combination of both.

In some embodiments, the user 115 can call the robotic charging station 118 to a parking space using the client-side application 164. In some embodiments, the robotic charging station 118 can park behind the user's parking space. In some embodiments, the user 115 can plug the robotic charging station 118 into their electric vehicle. In some embodiments, the user 115 can continue as they would after plugging into a standard charger. In some embodiments, the user 115 can return to their electric vehicle and unplug the robotic charging station 118.

In some embodiments, the robotic charging station 118 can be re-deployed to another electric vehicle. For example, the robotic charging station 118 can navigate from one vehicle to another vehicle allowing the now-charged vehicle to exit the space and drive away. The server-side application 112 can select a specific robotic charging station 118 to deploy in response to the request to charge an electric vehicle. The server-side application 112 can identify a specific robotic charging station 118 to deploy in response to the request based on one or more inputs including, for example, the proximity between a robotic charging station 118 and the target location, the amount of charge in a robotic charging station 118, the operational status of the robotic charging station 118, etc.

In some embodiments, advertisers can provide advertising content to the client-side application 164. In some embodiments, advertising content can be dynamic and programmable and can be loaded into one or more robotic charging systems 118. In some embodiments, advertising revenues can offset some or all of the system costs to site owners.

In some embodiments, additional features can be added to continually improve charging capacity, user experience, and system capability. In some embodiments, additional features can include one or more of the following: fully autonomous motion control and semi- or fully autonomous connection mechanism control; upgraded form factor and packaging for outdoor installations; daisy-chain capability; cameras; communication between the user 115 and the robotic charging system 118; communication between the robotic charging system 118 and the site operator or customer; drone-based architecture; solar charging; robotic arms; lighting, filming, or the like that requires an autonomously moving charging solution.

In some embodiments, the versatile robotic charging system 118 can be configured to deliver drinks, food, delivery of packages, mail, and the like. An example for the need for the unit can include: building an upscale condominium where an operator of the robotic charging system is installing multiple chargers. If it is difficult to add additional fixed vehicle charging stations, then the Charge as a Service can be deployed for the building to allow additional opportunities for vehicle charging. In this respect, a fleet of robotic charging system 118 can service a predefined area so that the building does not need to invest in additional fixed charging stations.

Figure 2:
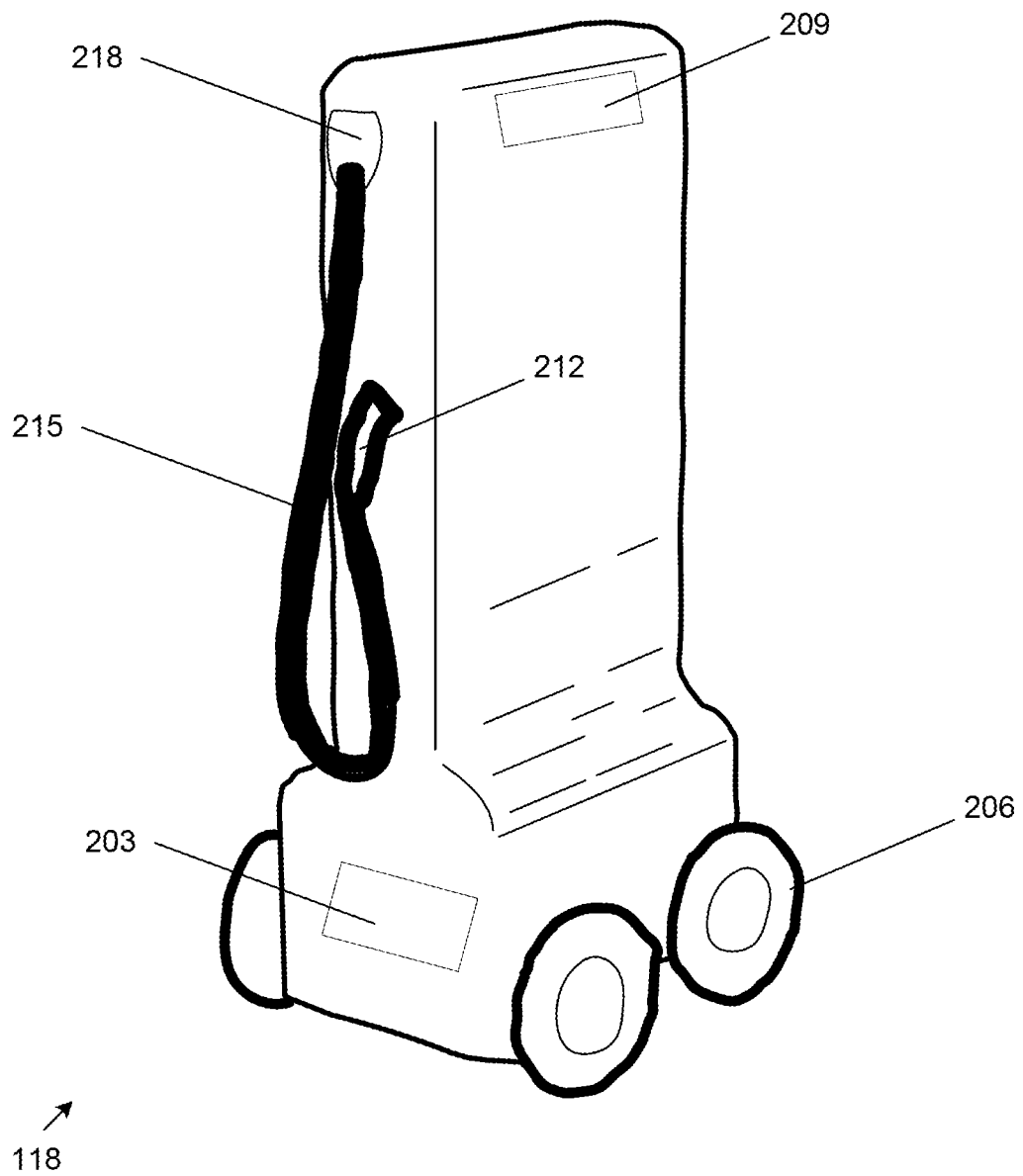
FIGS. 2-4 illustrate a robotic charging system according to some embodiments.

FIG. 2 illustrates a robotic charging system 118 and method according to some embodiments. In some embodiments, the robotic charging system 118 can be a self-contained, on-demand, mobile Charging as a Solution unit. The robotic charging system 118 can include one or more sensors 203. A sensor 203 can be a proximity sensor, infrared sensor, a Radio Detection And Ranging (RADAR) system, a Light Detection And Ranging (LiDAR) system, or other sensor(s) to detect the distance or proximity to nearby objects. The sensor 203 can be part of a sensor array position around the robotic charging system 118. The sensor 203 can generate sensor data indicating the presence, distance, or proximity of nearby objects.

In some embodiments, the robotic charging system 118 can also include a set of wheels 206. The wheels 206 can be rugged wheels to navigate all terrain in a typical parking garage environment (e.g., ramps, speed bumps, and the like). In some embodiments, the unit can detect and avoid obstacles in its path (i.e., pedestrians, cones, vehicles, and the like). In some embodiments, the unit can navigate around obstacles on its way to a target location.

In some embodiments, the robotic charging system 118 can also include one or more cameras 209. The camera 209 can capture image data surrounding the robotic charging system 118. The image data can be used in conjunction with the sensors data to allow the robotic charging system 118 to navigate. In some embodiments, the sensor data and image data can be uploaded to the computing system 110 in real time to provide rapid response, fault recovery, and maintenance of robotic charging system 118. The sensor data and image data can be recorded in a history that is stored as RCS data 124.

The sensor(s) 203 can generate sensor data used to navigate around obstacles. In some embodiments, cameras 209 can have remote-control functionality. For example, the camera's position, which establishes a field of view, can be controlled remotely by the computing system 110. In some embodiments, a user using the client-side application 164 can be used to control the robotic charging system 118. For example, the client-side application 164 can render a user interface to control components of the robotic charging system 118. A user 115 can provide commands that are communicated to the robotic charging system 118 over the network 130 via the server-side application 112.

In some embodiments, the robotic charging system 118 can also include a plug 212. The plug is configured to couple to an electric vehicle to charge the electric vehicle. The plug 212 can include an adaptor to couple with different types of electric vehicles. For example, various electric vehicles can have different charge ports conforming to industry or proprietary standards. An adaptor can engage the plug 212 to allow the plug to couple with a particular electric vehicle. The plug 212 can couple to an end of a cable 215. The cable can include relatively thick shielding to protect the conductive material inside the cable 215.

In some embodiments, the robotic charging system 118 can also include a cable reel 218. The cable reel can be built-in for ease of use and handle protection. In some embodiments, the cable 215 can roll inside the unit and out of view. For example, the cable 215 can recoil and be stored in the cable reel 218.

Some embodiments can include a Level 2 and/or DC fast charge functionality. In some embodiments, future levels can be incorporated as technology progresses. In some embodiments, the unit is a modular unit. In some embodiments, the unit can be intuitively engineered into a small and sleek mobile platform. Some embodiments can include a rugged build. Some embodiments include rapid deployment and can be cost-effective.

Figure 3:
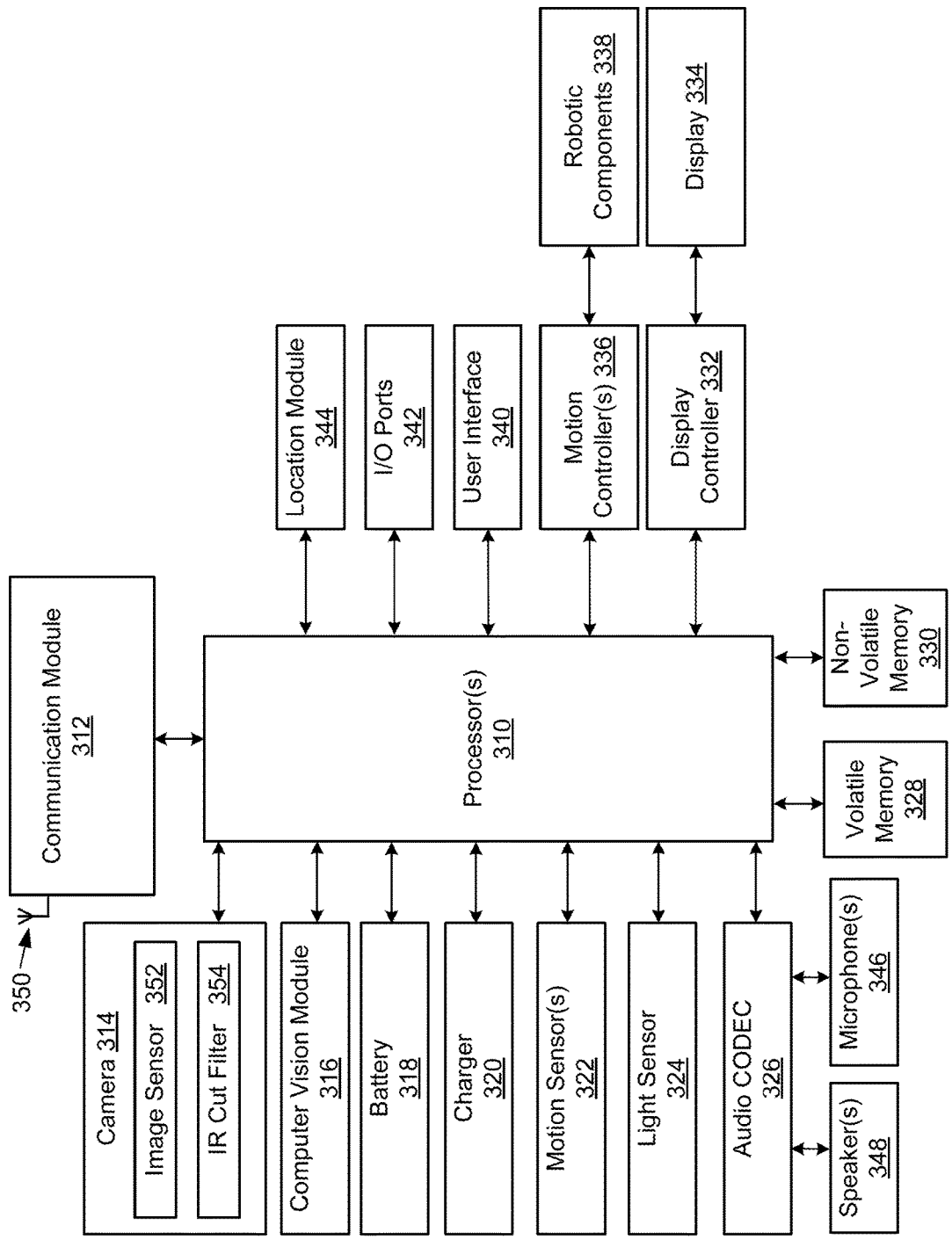

FIG. 3 is a functional block diagram of a robotic charging system 118 in accordance with some embodiments that can include one or more processor(s) 310, a communication module 312, a camera 314, a computer vision module 316, a battery 318, a charger 320, a motion sensor 322, a light sensor 324 an audio CODEC (coder-decoder) 326, volatile memory 328, and non-volatile memory 330, a display controller 332, a display 334, a motion controller 336, robotic components 338, a user interface 340, one or more I/O portions 342, and a location module 344. The processor(s) 310 (alternatively referred to herein as a "CPU," a "controller," and/or a "microcontroller") can comprise an integrated circuit including a processor core, memory, and programmable input/output peripherals. The processor(s) 310 can receive input signals, such as data signals or control signals, from the communication module 312, camera 314, motion sensor(s) 322, light sensor 324, microphone(s) 346, speaker(s) 348, volatile memory 328, non-volatile memory 330, display controller 332, motion controller 336, user interface 340, and I/O ports 342, and can perform various functions as described in the present disclosure. In various embodiments, when the processor(s) 310 is triggered by the motion sensor(s) 322, the camera 314, the microphone(s) 346, the speakers 348, the communication module 312, the location module 344, and/or another component, the processor(s) 310 performs one or more processes and/or functions. For example, the processor can receive a control signal (e.g., a command) from a user interface 340 or from the communication module 312. The command can be to navigate to a target location. The processor 310 can receive data signals from the camera 314, computer vision module 316, motion sensor 322, light sensor 324, microphone 346, the location module 344 to generate control instructions for navigating the robotic charging system 118. These control instructions can be transmitted to the motion controller(s) 336 to move the robotic charging system 118.

With further reference to FIG. 3, the communication module 312 can comprise an integrated circuit including a processor core, memory, and programmable input/output peripherals. The communication module 312 can be operatively connected to the processor(s) 310. In some embodiments, the communication module 312 is configured to handle communication links between the robotic charging station 118 and other, external devices, external receivers, external transmitters, and/or external transceivers, including client device 160, computing system 110, and other robotic charging systems 118, and to route incoming/outgoing data appropriately. For example, inbound data from an antenna 350 of the communication module 312 can be routed through the communication module 312 before being directed to the processor(s) 310, and outbound data from the processor(s) 310 can be routed through the communication module 312 before being directed to the antenna 350 of the communication module 312. As another example, the communication module 312 can be configured to transmit data to and/or receive data from a remote network device (e.g., one or more components of the computing system 110. The communication module 312 can include wireless and wired adapters. For example, the communication module 312 can include one or more wireless antennas, radios, receivers, transmitters, and/or transceivers configured to enable communication across one or more wireless networks, such as, without limitation, Wi-Fi, cellular, Bluetooth, Z-Wave, Zigbee, LPWAN(s), and/or satellite networks. The communication module 312 can receive inputs, such as data or control signals, from various components shown in FIG. 3. The communication module 312 can also include the capability of communicating over wired connections. The communication module 312 can also act as a conduit for data and control signals communicated between various components and the processor(s) 310.

With further reference to FIG. 3, the robotic charging station 118 can include volatile memory 328 and non-volatile memory 330. The non-volatile memory 330 can comprise flash memory configured to store and/or transmit data. For example, in certain embodiments, the non-volatile memory 330 can comprise serial peripheral interface (SPI) flash memory. In some embodiments, the non-volatile memory 330 can comprise, for example, NAND or NOR flash memory. The volatile memory 328 can comprise, for example, DDR3 SDRAM (double data rate type three synchronous dynamic random-access memory). In the embodiment illustrated in FIG. 3, the volatile memory 328 and the non-volatile memory 330 are illustrated as being separate from the processor(s) 310. However, the illustration of FIG. 3 is not intended to be limiting, and in some embodiments, the volatile memory 328 and/or the non-volatile memory 330 can be physically incorporated within the processor(s) 310, such as on the same chip. The volatile memory 328 and/or the non-volatile memory 330, regardless of their physical location, can be shared by one or more other components (in addition to the processor(s) 310) of the robotic charging station 118.

With further reference to FIG. 3, the robotic charging station 118 can include the camera 314. The camera 314 can include an image sensor 352. The image sensor 352 can include a video recording sensor and/or a camera chip. The camera 314 can further include an IR cut filter 354 that can comprise a system that, when triggered, configures the image sensor 352 to see primarily infrared light as opposed to visible light. For example, when the light sensor 324 detects a low level of ambient light (which can comprise a level that impedes the performance of the image sensor 352 in the visible spectrum), light emitting components of the robotic charging station 118 can shine infrared light out to the environment, and the IR cut filter 354 can enable the image sensor 352 to see this infrared light as it is reflected or refracted off of objects within the field of view. This process can provide the robotic charging station 118 with the "night vision" function.

With further reference to FIG. 3, some embodiments of the robotic charging station 118 can comprise the light sensor 324 and the one or more light-emitting components such as LEDs or IR light sources. The light sensor 324 can be one or more sensors capable of detecting the level of ambient light of the surrounding environment in which the robotic charging station 118 can be located. The light-emitting components can be one or more light-emitting diodes capable of producing visible light when supplied with power (e.g., to enable night vision).

In some embodiments, the robotic charging station 118 can further include one or more speaker(s) 348 and/or one or more microphone(s) 346. These components can allow users to interact with the robotic charging station 118 by issuing voice commands provided to the microphone 346 or by receiving command options played by the speakers 348. In addition, the microphone 346 can generate audio data of ambient noise to allow the robotic charging station 118 to perform navigation to a target location.

With further reference to FIG. 3, some embodiments of the robotic charging station 118 include a battery 318. The battery can be a rechargeable battery such as, for example, a Lithium-Ion battery. The battery can have a capacity that stores several kWh of energy. The battery 318 can power the robotic charging station 118 including the various components shown in FIG. 3. The battery 318 can also be used to charge an electric vehicle upon coupling a plug 212 to the electric vehicle. In some embodiments, the robotic charging station 118 can include multiple batteries 318. One or more batteries 318 can supply power to the components of the robotic charging station 118 while other batteries 318 can be used to charge electric vehicles. In some embodiments, the battery 318 is easily removable and swappable to allow the battery to be re-charged outside of the robotic charging station 118. For example, the robotic charging station 118 can include an enclosure or slot to house the battery 318. A door can be provided to allow easy removal of the battery 118. A newly charged battery can be inserted into the robotic charging station 118 after the discharged battery is removed.

While FIG. 3 shows a camera 314, motion sensors 322, and light sensors 324 that provide data allowing the robotic charging station 118 to control its navigation, other sensors can be included. Other sensors include an accelerometer, a barometer, a humidity sensor, and a temperature sensor. The accelerometer can be one or more sensors capable of sensing motion and/or acceleration. The one or more of the accelerometer, the barometer, the humidity sensor, and the temperature sensor can be located outside of a housing of the robotic charging station 118 so as to reduce interference from heat, pressure, moisture, and/or other stimuli generated by the internal components of the robotic charging station 118.

In some embodiments, computer vision module(s) (CVM) 316 can be included in the robotic charging station 118. For example, the CVM 316 can be a low-power CVM that is capable of providing computer vision capabilities and functionality to the processor 310. The low-power CVM can include a lens, a CMOS image sensor, and a digital processor that can perform embedded processing within the low-power CVM itself, such that the low-power CVM can output post-processed computer vision metadata to the processor(s) 310 (e.g., via a serial peripheral bus interface (SPI)). As such, the low-power CVM can be considered to be one or more of the motion sensor(s) 322, and the data type output in the output signal can be the post-processed computer vision metadata. The metadata can include information such as the presence of a particular type of entity (e.g., person, vehicle, object, etc.), a direction of movement of the entity, a distance of the entity from the robotic charging station 118, etc. In some embodiments, the motion sensor(s) 322 include a plurality of different sensor types capable of detecting motion such as PIR, AIR, low-power CVM, and/or cameras.

The robotic charging station 118 can further include a charger 320. The charger 320 includes circuitry that converts the output of the battery 318 to a desired voltage output that is provided to the electric vehicle. The charger 320 can include a cable 215 having a plug 212 that couples to the electric vehicle for delivering the power supply of the battery to the electric vehicle.

Some embodiments of the robotic charging station 118 can further include a display controller 332. The display controller can receive data and control signals from the processor to display images (e.g., still images or video) on a display 334. For example, image data can be stored in the volatile memory 328 or non-volatile memory 330. The processor 310 can provide this as an input to the display controller 332. In turn, the display controller 332 converts the input into an output to be rendered on the display 334.

The robotic charging station 118 can further include one or more motion controllers 336. The motion controllers can include circuitry that receives commands from the processor 310 and converts the commands into signals provided to robotic components 338. The robotic components 338 can include electrical motors that drive wheels, brakes, levers, gears, axles, and steering components. The robotic components 338 can comprise electro-mechanical components that receive electrical signals and convert them into mechanical motion. The motion controllers can also receive feedback signals from the robotic components 338.

Some embodiments of the robotic charging station 118 can further include a user interface 340. The user interface can include a panel of buttons, switches, a touch screen, a joystick, or other components that convert user input into electronic signals. The user interface can be used by users 115 who request charging services or by mechanics who wish to repair or otherwise service the robotic charging station 118.

In some embodiments, the robotic charging station 118 can further include one or more I/O ports 342. I/O ports can provide direct access to the process to update firmware or code executed by the robotic charging station 118. The I/O ports 342 can be used to run and obtain diagnostics of a particular robotic charging station 118. As another example, an I/O port can also a first robotic charging station 118 to be daisy chained with a second robotic charging station 118. The daisy-chained robotic charging stations 118 may, together, charge an electric vehicle. The daisy-chained robotic charging stations 118 can also allow a first robotic charging station 118 to charge a second robotic charging station 118. In this respect, the batteries of multiple robotic charging stations 118 can be effectively combined by coupling different robotic charging stations 118 together using the I/O ports 342.

In some embodiments, the robotic charging station 118 can further include a location module 344. The location module 344 can be, for example, a Global Positioning Satellite (GPS) module that obtains GPS coordinates. The location module 344 can receive an instant location of the robotic charging station 118. The processor 310 can use the current location for navigating or tracking the location of the robotic charging station 118. The current location can be uploaded to the computing system 110 via the communication module 312 to allow the computing system to track a group of robotic charging stations 118.

Figure 4:
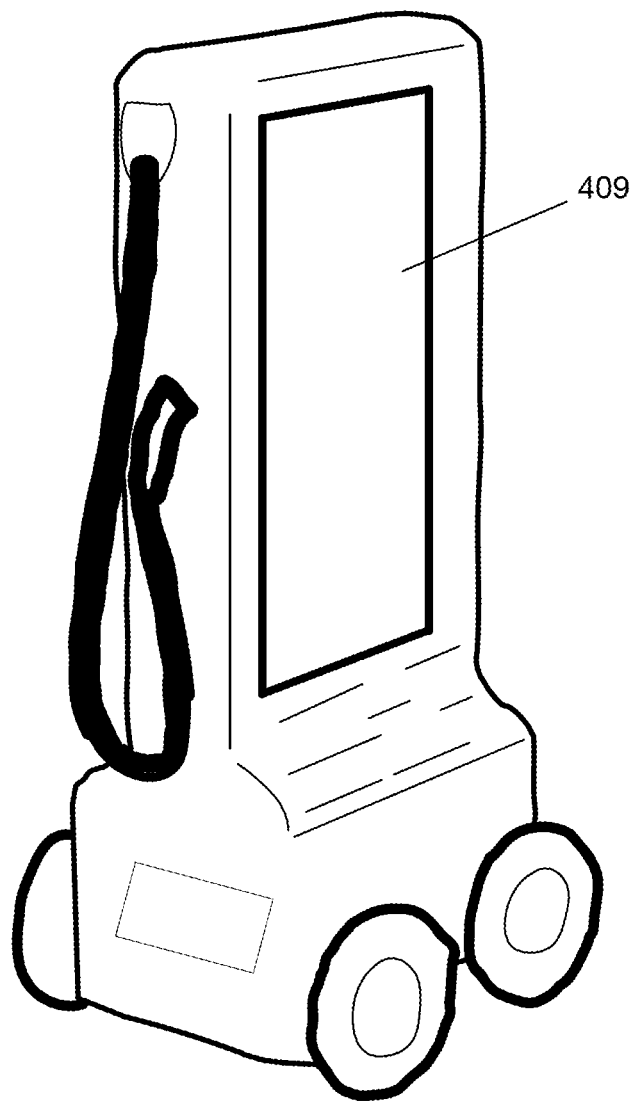

FIG. 4 illustrates a display according to some embodiments. The robotic charging system 118 can include a display 409 to display image data. The display 409 can present advertisement content. For example, advertisement content can be formatted as a video or stationary image file. The advertisement content can be received over the network by the computing system 110. The advertisement content can be stored in a storage device included in the robotic charging system 118. The advertisement content can be streamed or downloaded by the robotic charging system 118.

Figure 5:
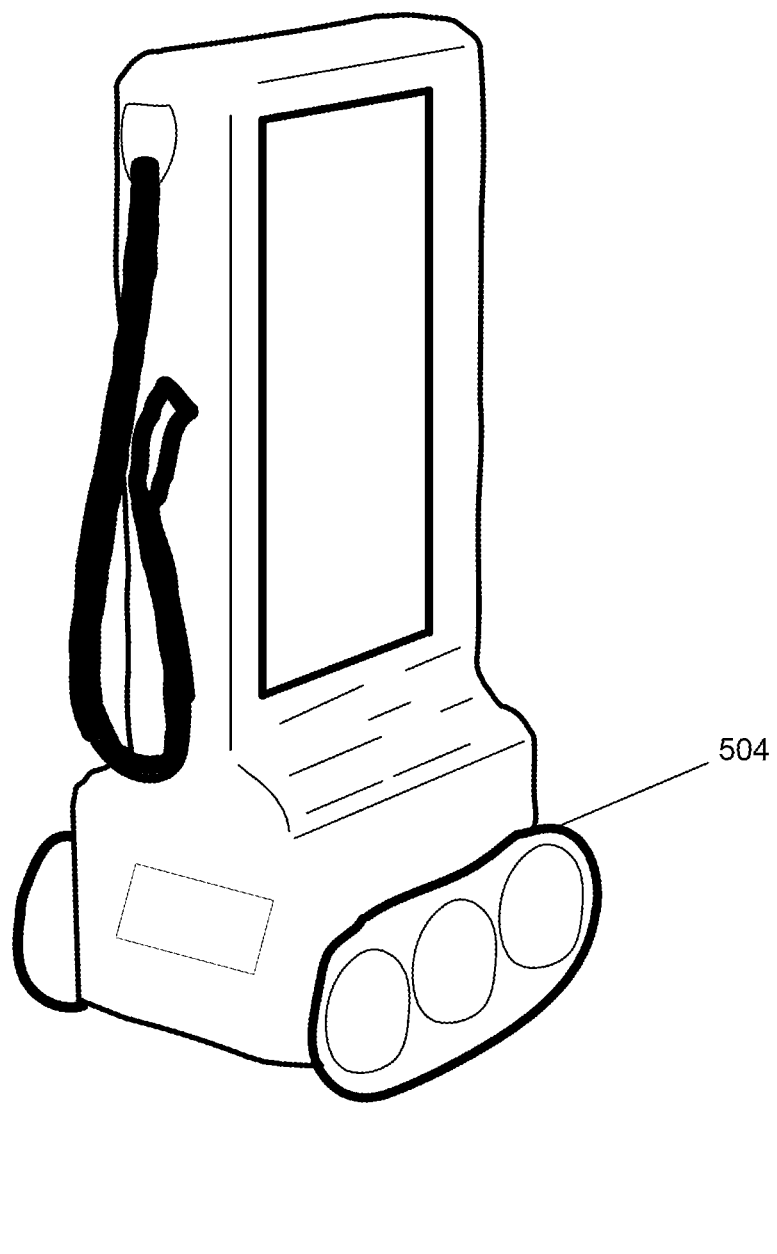
FIG. 5 illustrates heavy duty treads according to some embodiments.

FIG. 5 illustrates heavy duty treads according to some embodiments. For example, a continuous track 504 made of heavy duty tread can be positioned around the wheels, rollers or other conventional track driving elements. The wheels can be driven by a motor. The wheels cause the continuous track 504 to rotate, thereby moving the robotic charging system 118 across the terrain.

Figure 6:
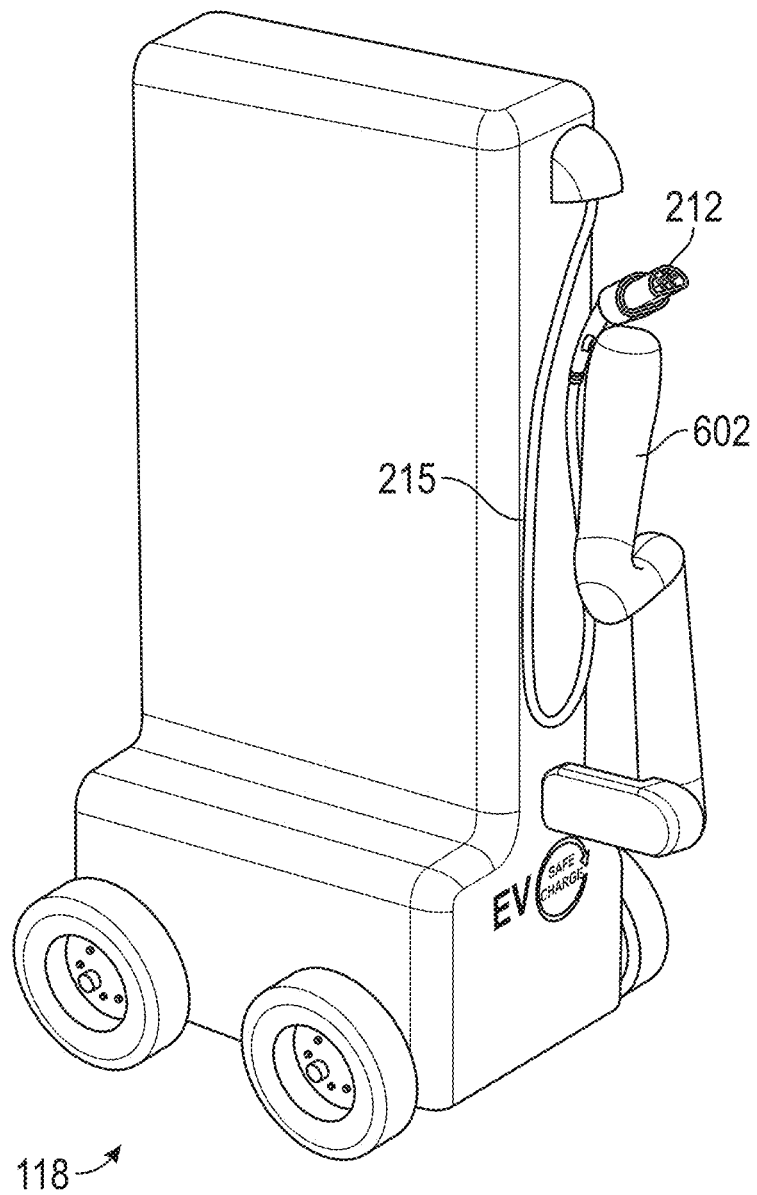
FIG. 6 illustrates robotic arms according to some embodiments.

FIG. 6 illustrates robotic arms according to some embodiments. Some embodiments include robotic arm 602 for autonomous vehicle charging. One of the complexities with autonomous EV charging can be plugging it in the charging connector to the vehicle. The robotic arm 602 can be coupled to the plug 212 to allow the plug to move autonomously. The robotic arm 602 is an example of a robotic component 338 that is controlled by a motion controller 336 that can receive commands from a processor 310. The robotic arm 602 can move the plug 212 towards the electric vehicle to prepare the electric vehicle for charging. In some embodiments, the robotic arm can include one or more levers or other components that can move in three dimensions and can also rotate the plug about an axis.

In some embodiments, the robotic charging system 118 can obtain image data from a camera 314 and perform image recognition using a CVM 316. The CVM 316 can identify the specific location of the vehicle. The CVM 316 can also identify the location of the charge port of the electric vehicle using image recognition techniques. Based on this data, the processor 310 can control the robotic arm 602 to move the plug close to the vehicle's chart port to improve the ease of coupling the plug 212 to the vehicle's charge port.

In some embodiments, a user 115 can plug the robotic charging system 118 into the charging connector of the vehicle manually. In some embodiments, plugging the robotic charging system 118 into the charging connector manually can be less complex and less costly. In some embodiments, unplugging the robotic charging system 118 robotically can become less complex and less costly.

Figure 7:
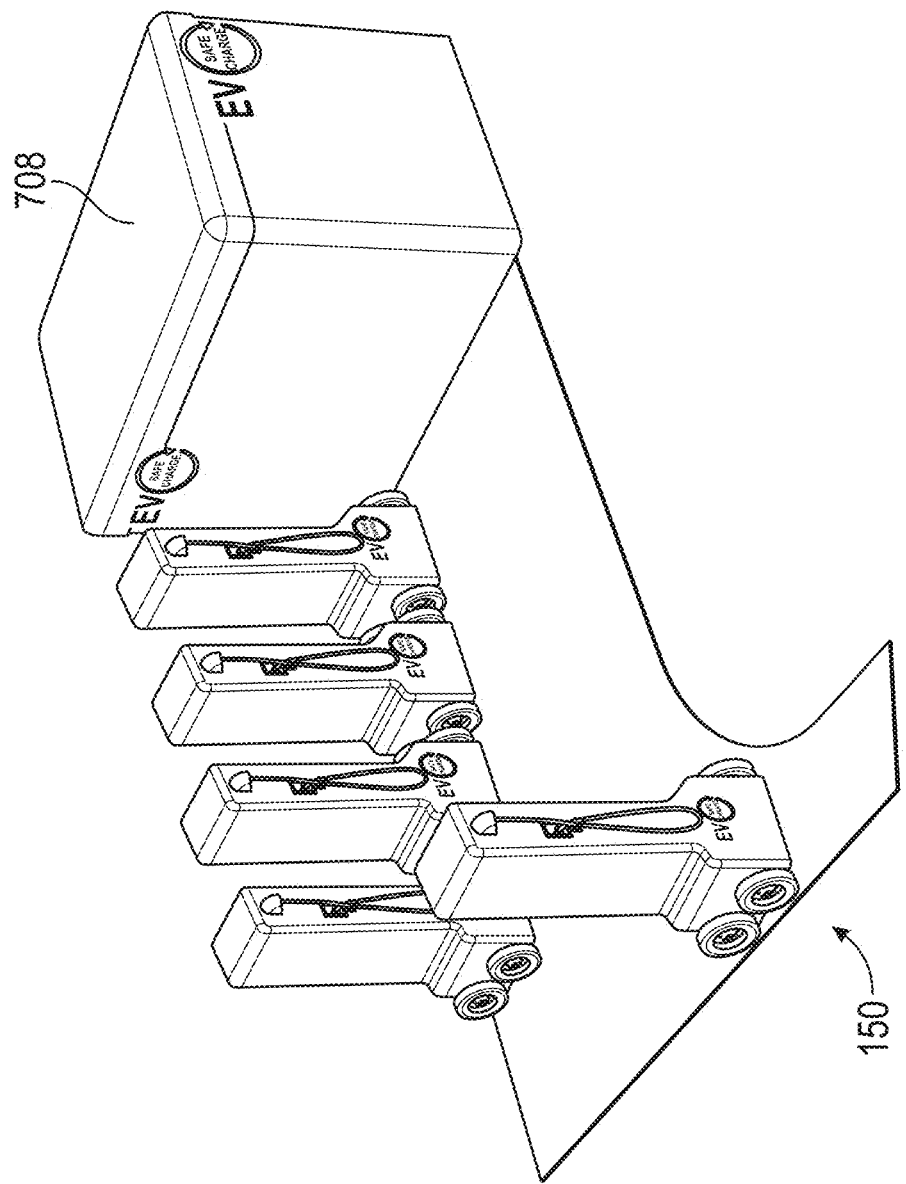
FIG. 7 illustrates a home base according to some embodiments.

FIG. 7 illustrates a home base according to some embodiments. Some embodiments include a battery system 708 at the home base 150. In some embodiments, the robotic charging system 118 can return to its home base 150 for recharging or servicing. In some embodiments, the battery system 708 can charge based on time of use pricing from the utility, solar, wind, or any other power source. In some embodiments, the battery system 708 can itself be used to charge the robotic charging system 118 onsite. In some embodiments, the home base 150 can communicate with a charger management application 114 to allow the networked environment 100 to track various deployed robotic charging systems 118.

Some embodiments include a variety of significant benefits to utilizing the unit for EV charging. Some embodiments include installation of one home base 150 recharging location. In some embodiments, this location can be near an electrical room. In some embodiments, benefits of an installation can include one or more of the following: less conduit running through floors and walls; minimal impact to structure; and lower installation costs to site owners. In some embodiments, swappable batteries 318 can be used. In some embodiments, a discharged battery 318 can be replaced with a fully charged battery 318 mechanically allowing for rapid re-deployment without a recharging delay. Some embodiments include solar charging of an internal battery pack. Some embodiments include wind power and other renewable energy sources.

In some embodiments, the robotic charging system 118 can be configured to provide mobile energy storage, including remaining at a fixed location for extended periods of time. In some embodiments, the period of time can be several years. In some embodiments, the robotic charging system 118 can be located wherever it is needed. Some embodiments can include one or more of the following: charging from the grid or a renewable source such as solar, charging at night when electricity pricing can be lower on the grid and discharging during the day, and when electricity pricing can be higher, and discharging when needed when solar is not available, for example: at night or on a cloudy day.

Figure 8:
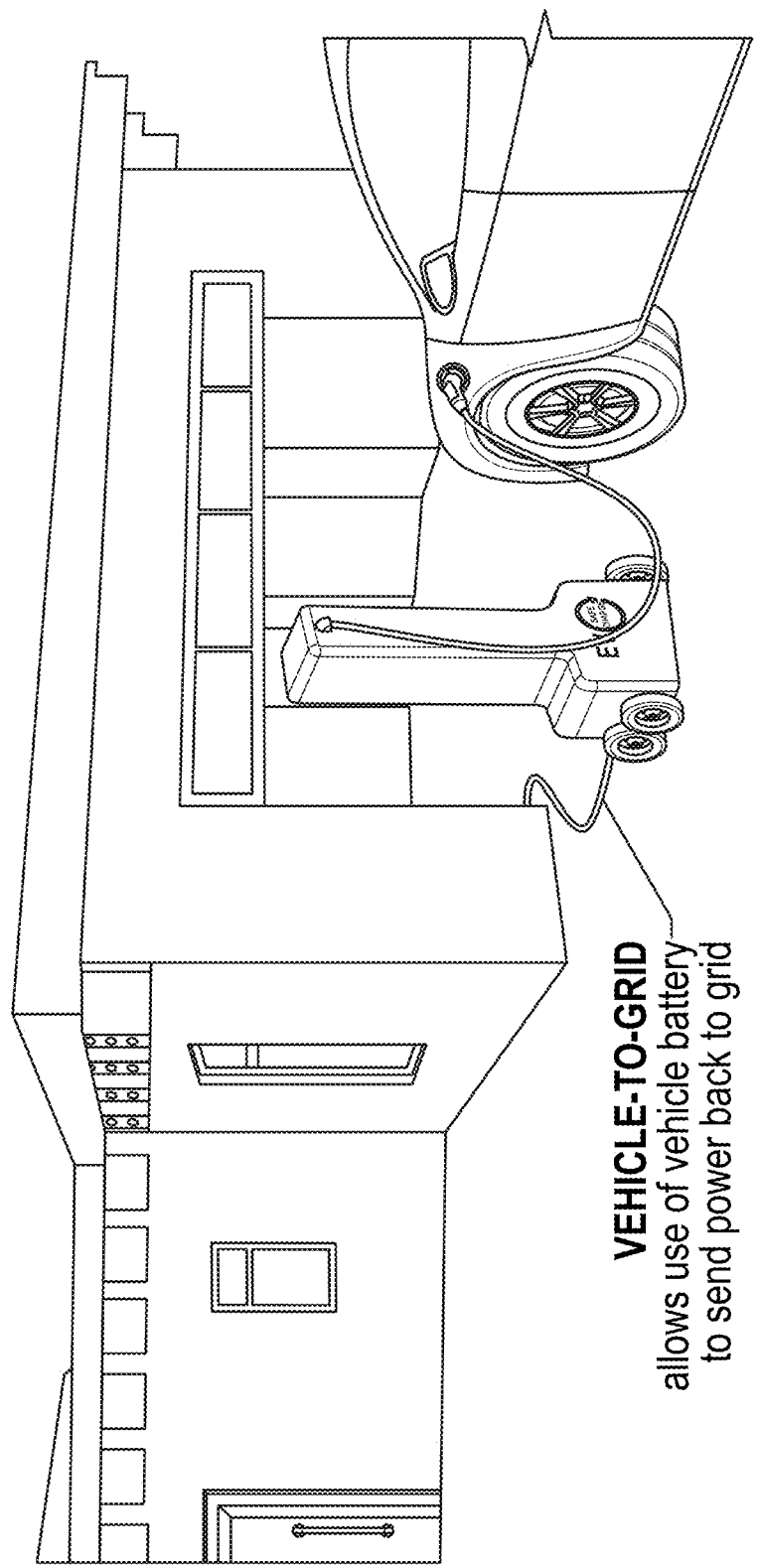
FIG. 8 illustrates a vehicle-to-grid mechanism according to some embodiments.

FIG. 8 illustrates a vehicle-to-grid mechanism according to some embodiments. In some embodiments, the robotic charging system 118 can be configured to function as a device-to-grid (D2G), and vehicle-to-grid (V2G) mechanism. A grid refers to an electrical grid managed by utility providers that deliver power to residential, commercial, and industrial customers. Customers can pay for electrical utility services on a consumption-basis. In a D2G arrangement, the robotic charging system 118 can couple to the grid via an I/O port to provide the charge stored in the battery 318 to the grid. In a V2G arrangement, the robotic charging system 118 is further coupled to the electric vehicle via the plug 212 to transfer charge stored in the vehicle through the robotic charging system 118 to the grid.

Figure 9:
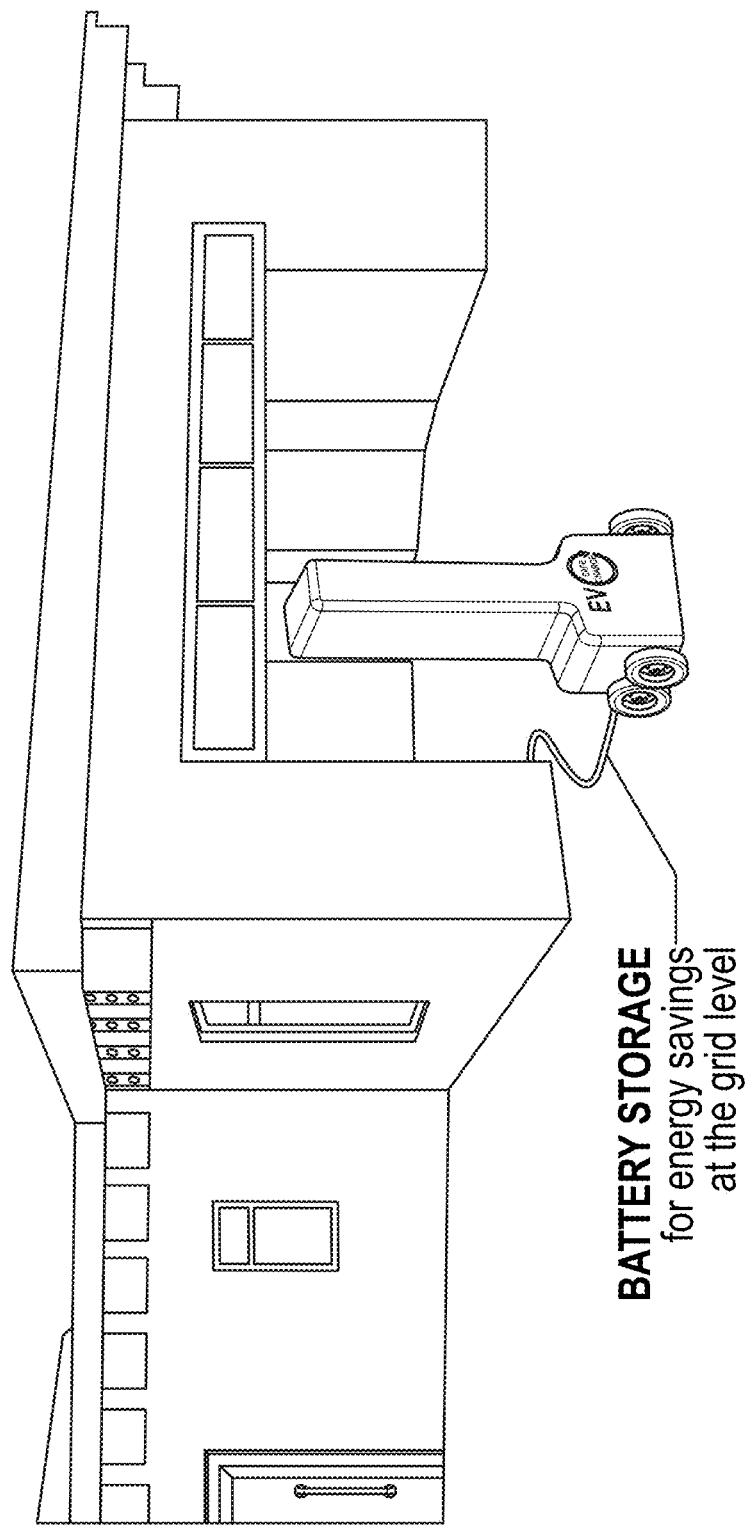
FIG. 9 illustrates a battery storage according to some embodiments.

FIG. 9 illustrates a battery storage according to some embodiments. In some embodiments, the robotic charging system 118 can use its onboard battery 318 to power a home or other device or location, and can power the robotic charging system 318 itself. In some embodiments, the robotic charging system 118 can put energy back into the grid and can be used for grid services, such as demand response, frequency regulation or throttling charging based on information from the grid.

Figure 10:
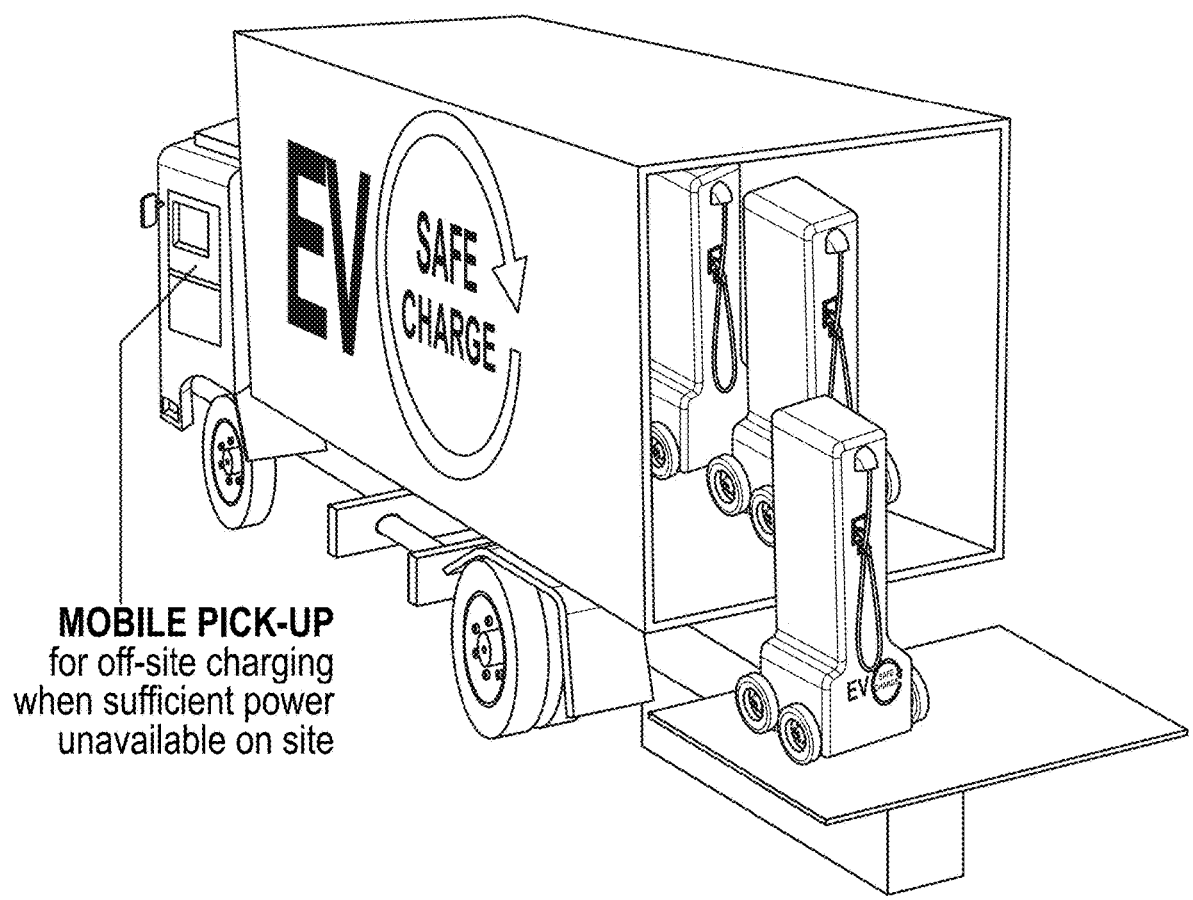
FIG. 10 illustrates a mobile pick-up according to some embodiments.

FIG. 10 illustrates a mobile pick-up according to some embodiments. Some embodiments include a mobile pick-up. In some embodiments, the number of robotic charging systems 118 can be increased or decreased based on demand. In some embodiments, if on-site power does not meet the requirement for vehicle charging, the robotic charging systems 118 can be picked up and charged offsite. For example, a charger management application 114 can track the location of each robotic charging system 118 along with their respective battery levels. If the battery level for a robotic charging system 118 is low, the charger management application 114 can transmit a target location to the robotic charging system 118 for it to be recharged. If a home base 150 is too far away, the charger management application 114 can instruct the robotic charging system 118 to navigate to a target location that is a pick-up site. In some embodiments, the charger management application 114 can also communicate with truck drivers to pick up robotic charging stations 118. For example, the charger management application 114 can transmit a pick-up location to the client device of a truck driver along with an identifier for each robotic charging system 118 that is instructed to be at the pick-up site. The truck driver can track the identities and the number of robotic charging systems 118 that have autonomously navigated to the pick-up site. The truck driver can transport the collected robotic charging systems 118 to an off-site location or home base 150 for recharging or servicing.

Figure 11:
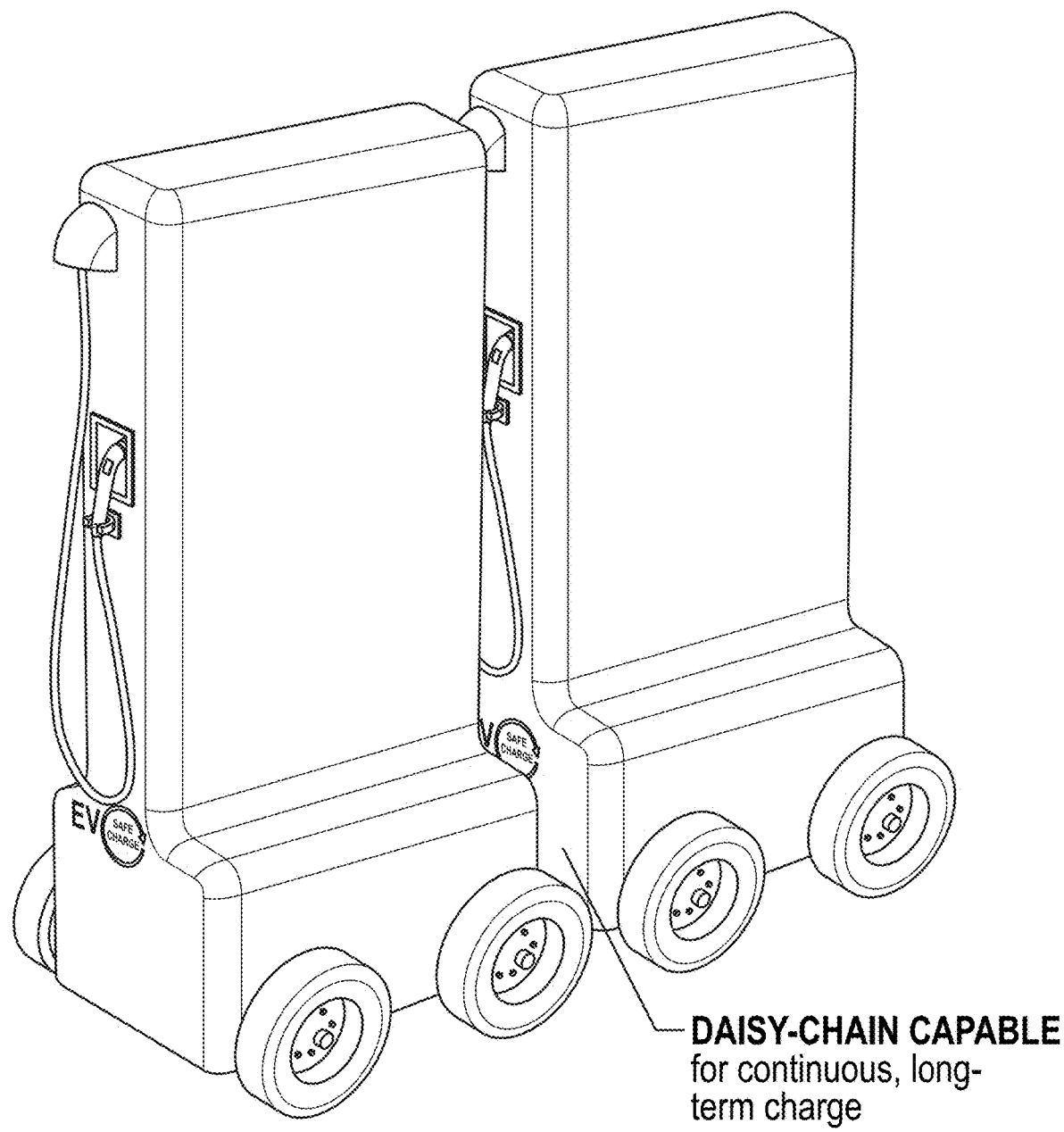
FIG. 11 illustrates a daisy-chain capability according to some embodiments.

FIG. 11 illustrates a daisy-chain capability according to some embodiments. The ultimate robotic charging experience can be a fully-autonomous, hive-mind system. In some embodiments, the robotic charging system 118 can call additional daisy-chain robotic charging systems 118 when necessary. For example, a first robotic charging system 118 can transmit a request to daisy-chain to the charger management application 114. The charger management application 114 can identify a second robotic charging system 118 based on its instant location and/or battery level. The charger management application 114 can instruct the second robotic charging system to navigate a target location that is the location of the first robotic charging system 118. Some embodiments require minimal operator interaction for day-to-day operations. Some embodiments include continuous long-term charge.

Figure 12:
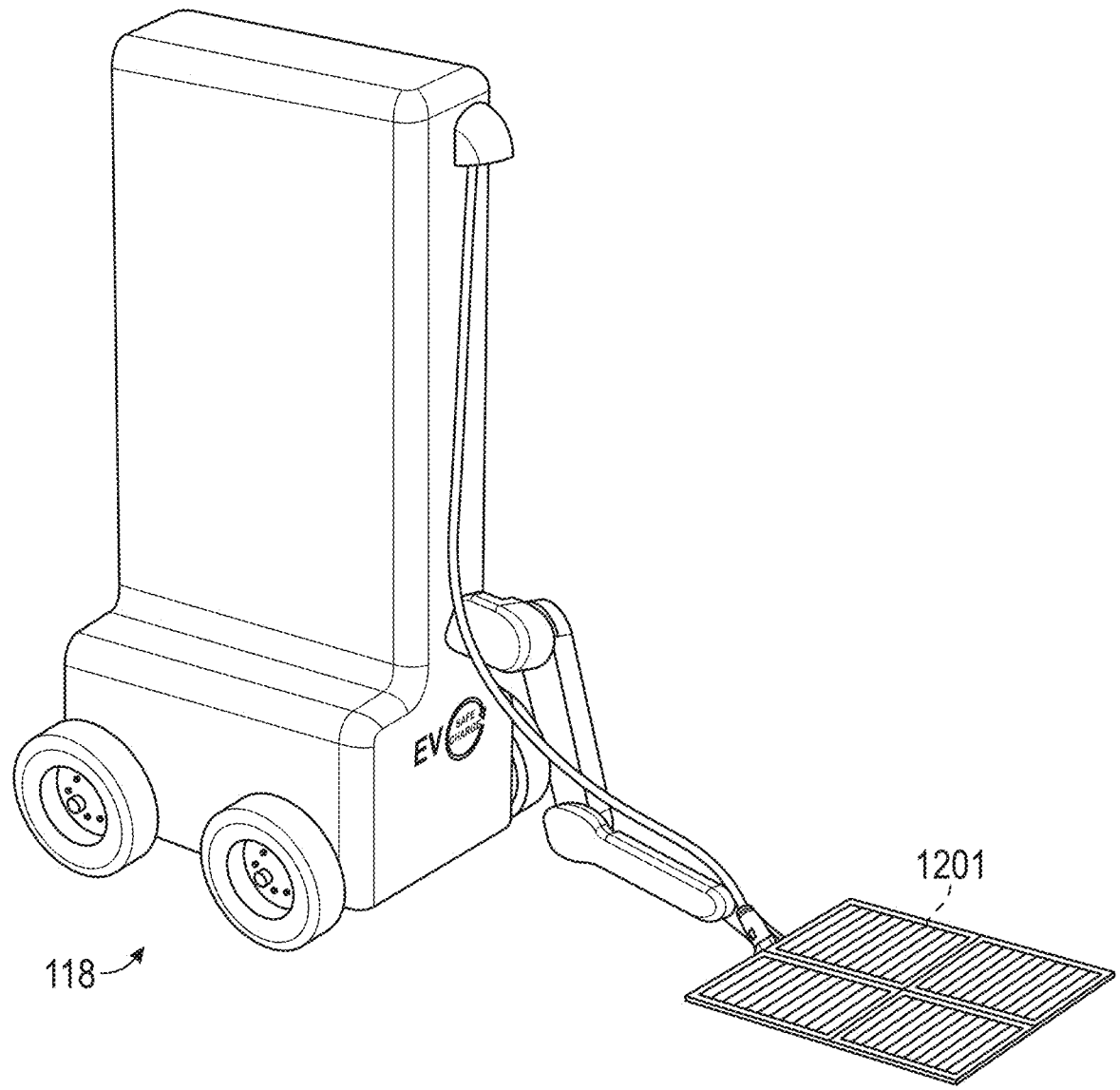
FIG. 12 illustrates an inductive charging platform according to some embodiments.

FIG. 12 illustrates an inductive charging platform according to some embodiments. Some embodiments include an inductive charging platform 1201. In some embodiments, the inductive charging platform can be used for vehicles with a wireless charge capability. Specifically, FIG. 12 shows an inductive charging platform 1201 configured to inductively couple to an electric vehicle. A vehicle can inductively couple to the inductive charging platform 1201 by positioning inductive components over the inductive charging platform 1201. This allows charge to be delivered to the electric vehicle via the inductive charging platform 1201. The robotic charging system 118 first couples to the inductive charging platform 1201 using a plug 112. The plug 112 can be fitted with an adaptor to connect the plug to the inductive charging platform 1201. The robotic charging system 118 can carry various adaptors to allow the plug to couple with different ports including the charge port of the electric vehicle and a port on the inductive charging platform 1201.

Figure 13B:
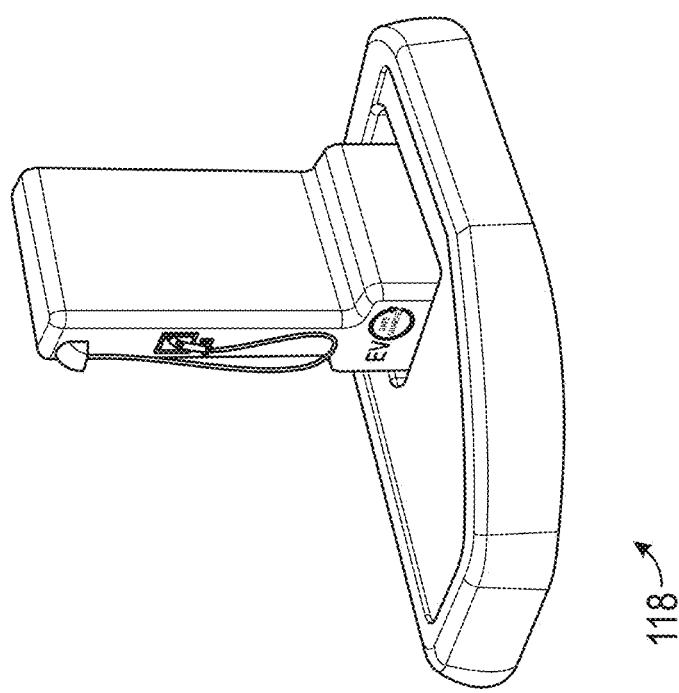
FIG. 13B illustrates a seafaring model according to some embodiments.
Figure 13A:
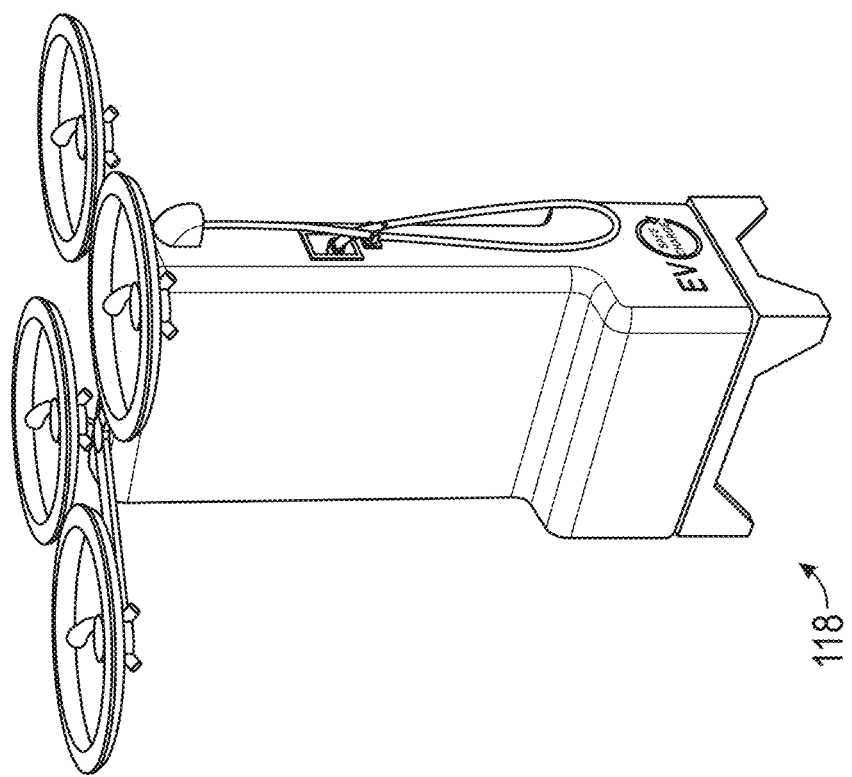
FIG. 13A illustrates a drone-based architecture according to some embodiments.

FIG. 13A illustrates a drone-based architecture according to some embodiments. In some embodiments, the robotic charging system 118 can be enabled with a drone for transport. In some embodiments, the drone enabled system can bring the charge to users 115 in difficult locations.

FIG. 13B illustrates a seafaring model according to some embodiments. Some embodiments include a seafaring model. In some embodiments, the seafaring model can bring on the go charging to users 115 on the water vehicle. In some embodiments, the robotic charging system 118 can be mounted on an autonomous or other floating craft, for example: a small boat. In some embodiments, the small boat can be deployed in a marine environment such as a marina, lake, river or ocean/sea to provide charging to electric boats and watercraft. In some embodiments, a user 115 can call the robotic charging system 118 via the client-side application 164 or operator interaction. In some embodiments, the operator interaction can include: an operator on site or via phone, website, text, chat, and the like. In some embodiments, the robotic charging system 118 can navigate to the user so that the user can charge their boat or other water craft. In some embodiments, the robotic charging system 118 can navigate back to its home port for recharging or pickup for offsite charging. In some embodiments, the robotic charging system 118 can be installed in a larger boat to provide charging across longer distances.

Figure 14:
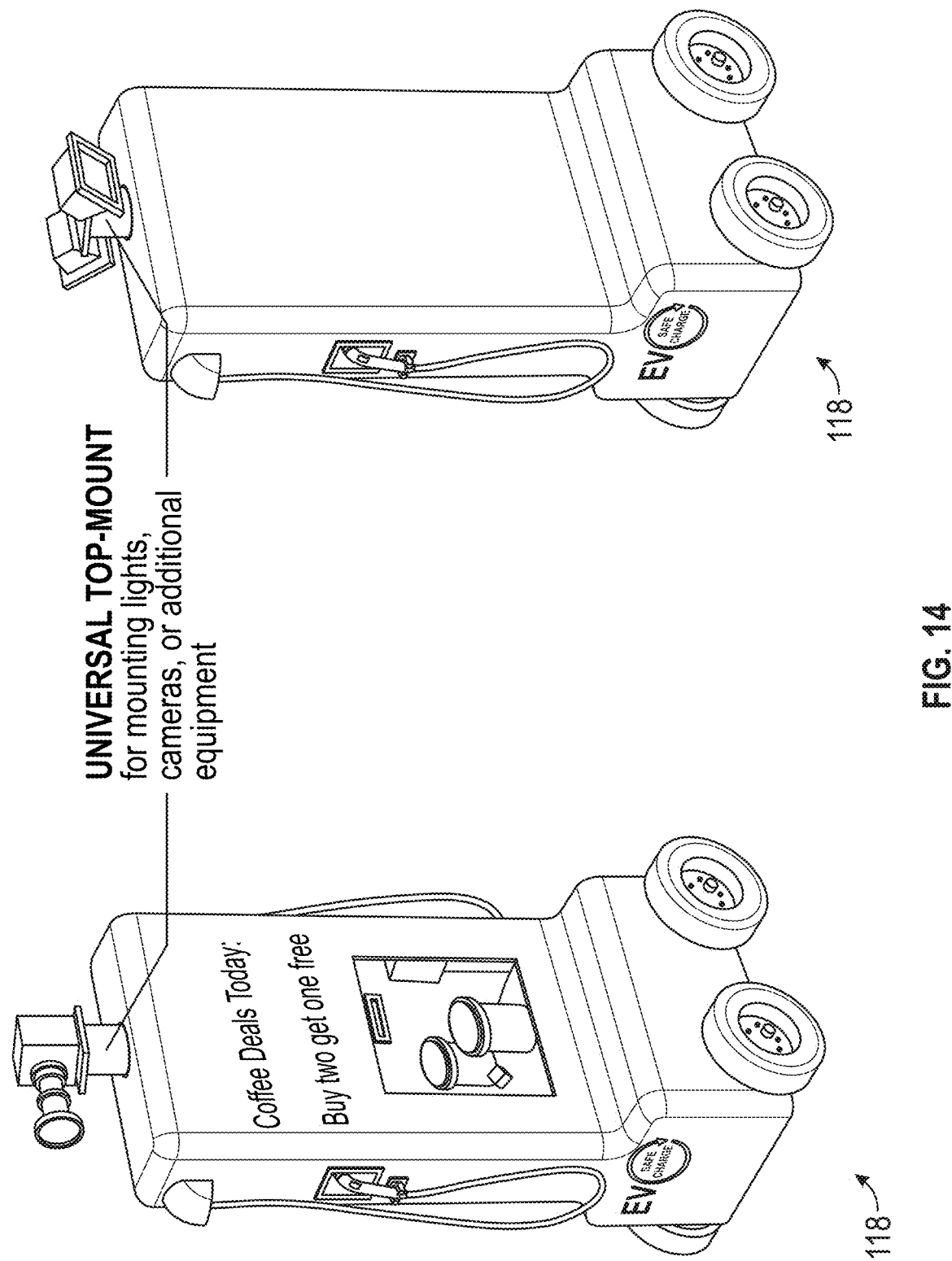
FIG. 14 illustrates a universal top-mount according to some embodiments.

FIG. 14 illustrates a universal top-mount according to some embodiments. Some embodiments include a universal top mount. In some embodiments, the universal top mount can be used for mounting lights, cameras, or the like. In some embodiments, camera mounting can provide filming for safety in remote locations. In some embodiments, lights can be mounted for safety. Accessories attached to the top-mount can establish communication with the robotic charging system 118 by coupling to the I/O port 342 or by communicating wirelessly to the communication module 312 of the robotic charging system 118.

Figure 15:
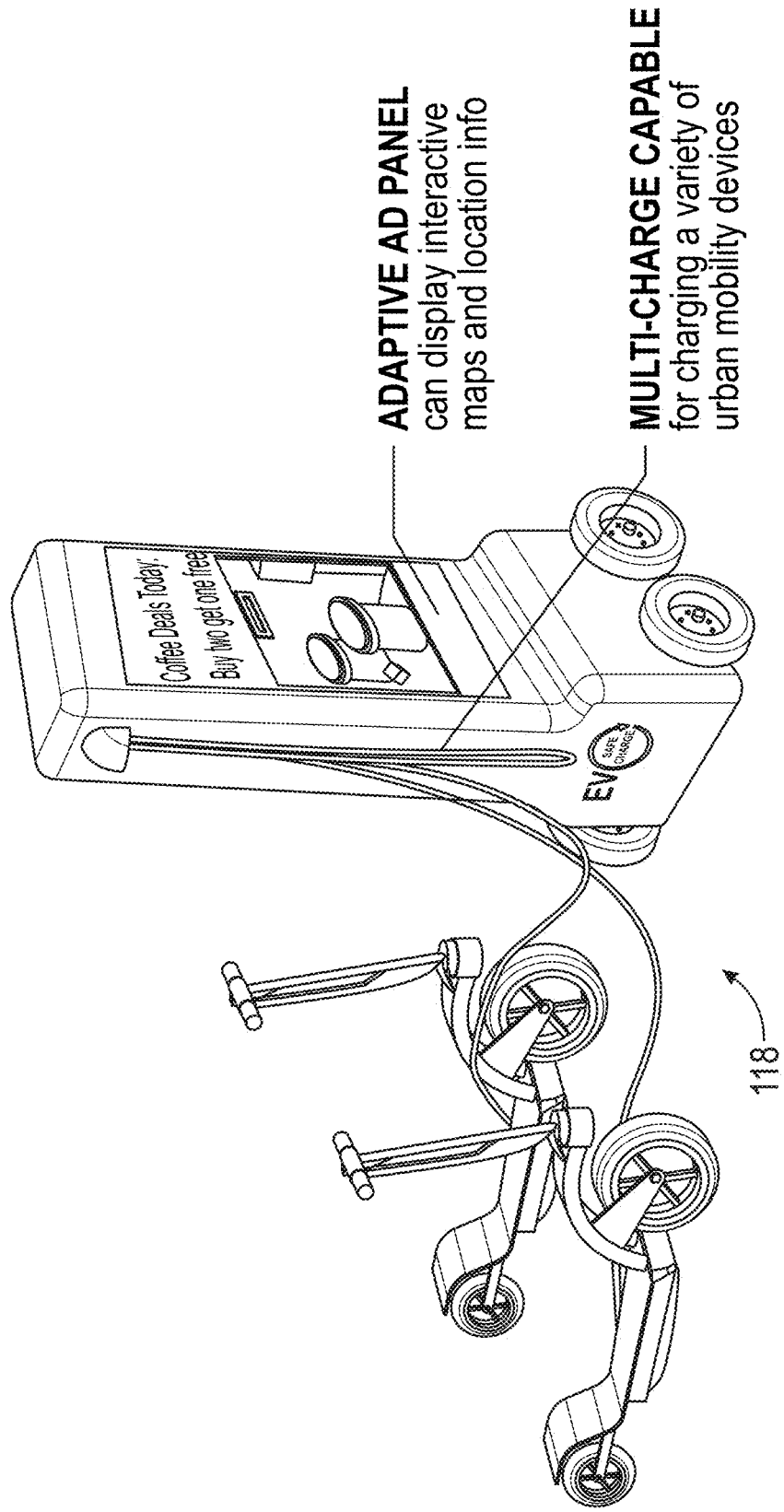
FIG. 15 illustrates an adaptive ad panel and multi-charge capability according to some embodiments.

FIG. 15 illustrates an adaptive ad panel and multi-charge capability according to some embodiments. Some embodiments include a multi-charge capability. In some embodiments, the multi-charge capability can be used for charging a variety of electric vehicles (e.g., urban mobility devices). Some embodiments include an adaptive ad panel. In some embodiments, the adaptive ad panel can display interactive maps and location information. The content displayed by the adaptive ad panel can be received from the computing system 110. In some embodiments, one version of the robotic charging system 118 can be a solution to the charging challenge of urban mobility.

In some embodiments, the robotic charging system 118 can be configured to be deployed anywhere publicly. In some embodiments, electric vehicles such as, for example, scooters, ebikes, and the like can easily charge with the robotic charging system 118 in urban settings. In some embodiments, multiple power ports and charging cables can be incorporated to charge a variety of smaller vehicles and cell phones. In some embodiments, production information can be displayed on the ad panel. Some embodiments include, next shoot set up, call time, and the like. In some embodiments, the robotic charging system 118 can be a versatile rapidly and easily deployable charging solution.

Figure 16:
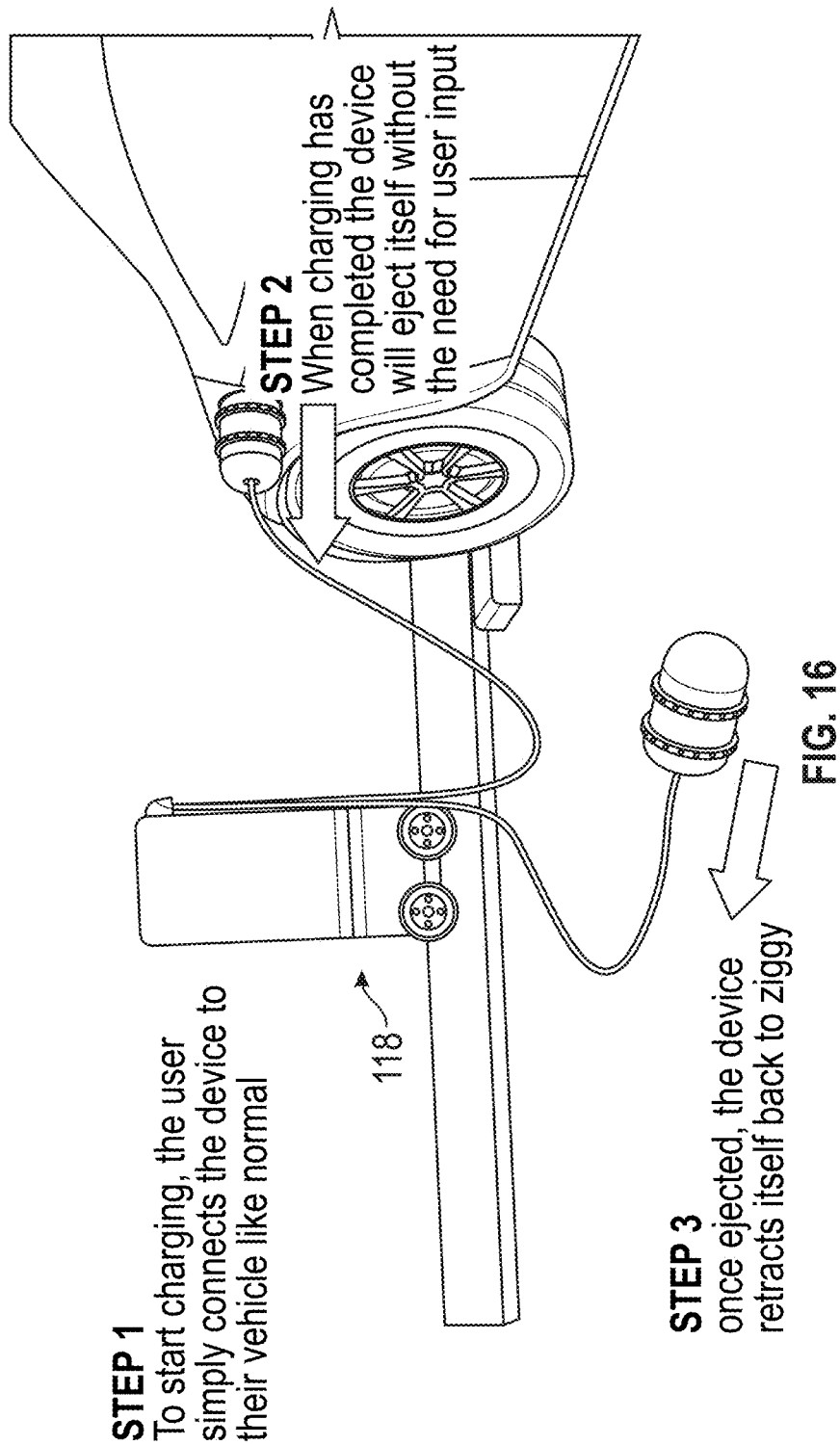
FIG. 16 illustrates a self-ejecting charger according to some embodiments.

FIG. 16 illustrates a self-ejecting charger according to some embodiments. Some embodiments of the robotic charging system 118 can include a self-eject functionality. In some embodiments, the self-eject functionality can be rugged and designed, engineered and manufactured to drop to the ground. In some embodiments, the self-eject functionality can have a flexible form factor and built-in exterior wheels, or bearings. In some embodiments, the self-eject functionality can be configured with universal charging port compatibility for Level 2 and/or DC fast charges. In some embodiments, when charging is complete the robotic charging system 118 will eject itself without the need for user intervention. For example, the robotic charging system 118 can track the charging status and determine when charging is complete. Upon detecting the charging is complete, the processor 310 can generate a control signal to a motion controller 336 that controls a robotic component associated with the plug 212. This robotic component can actuate mechanical components that allow the plug to be decoupled from the charge port of the electric vehicle.

In some embodiments, the cable 215 of the robotic charging system 118 can retract itself after it has ejected from the electric vehicle. In some embodiments, the robotic charging system 118 can then become available for other users. In this respect, the plug 212 is configured to automatically decouple from the electronic vehicle in response to charging being complete and the cable 215 attached to the plug 212 is configured to automatically recoil after the plug 212 is decoupled from the vehicle's charge port.

In some embodiments, the plug 212 is a self-ejecting charger connector that can be placed at the end of the charging cable. In this embodiment, the plug 212 can be controlled by the processor 310 in response to a charge completion status. In some embodiments, the self-ejecting charger connector can be placed directly into a vehicle. In some embodiments, the charger connector can eject itself from the vehicle and drop to the ground. In some embodiments, the charger connector can be placed where it can be grabbed by the next EV user.

Figure 17:
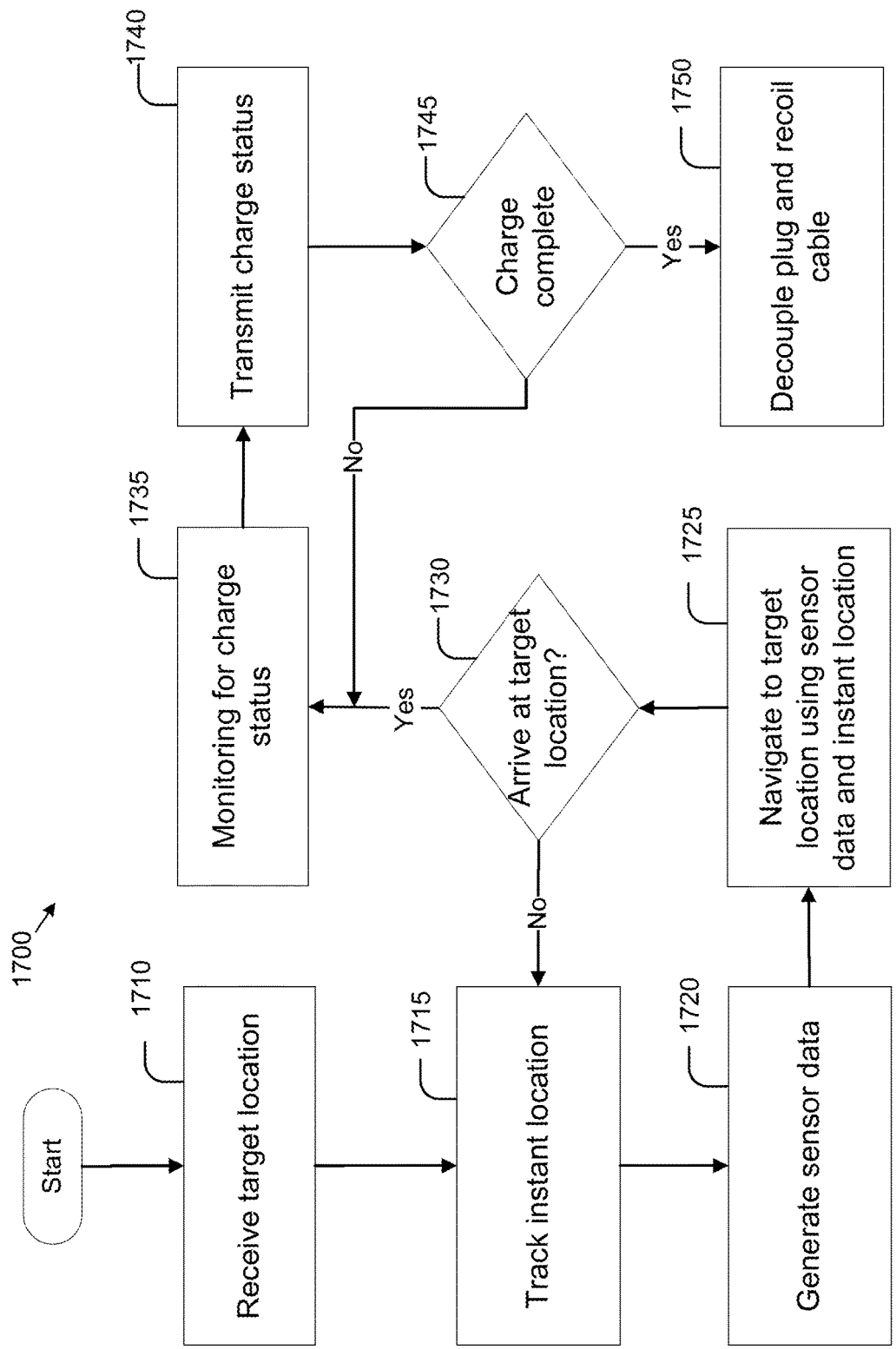
FIG. 17 is a flowchart illustrating an example of the functionality by a robotic charging system in the networked environment according to various embodiments.

FIG. 17 is a flowchart illustrating an example of the functionality by a robotic charging system in the networked environment according to various embodiments. It is understood that the flowchart of FIG. 17 provides an illustrative example of the many different types of functional arrangements that can be employed to implement the operation of the portion of a robotic charging system as described herein. The flowchart of FIG. 17 can also be viewed as depicting an example of a method 1700 implemented in the networked environment 100 of FIG. 1 according to one or more embodiments. Portions of the flowchart can also represent operations and functionality provided by the processor 310.

At item 1710, the robotic charging system 118 receives a target location. The target location can represent the location of an electric vehicle to be charged. The target location can be specified by a user using the client-side application 164. The target location can be received by a server-side application 112 and then transmitted to the robotic charging system 118. The server-side application 112 can select the robotic charging system 118 as the designated robotic charging system 118 to respond to a user request to charge the electric vehicle. The server-side application 112 can select the robotic charging system 118 based on the instant location of the robotic charging system 118, the battery level of the robotic charging system 118, and/or the operational status of the robotic charging system 118 (e.g., online, offline).

In other embodiments, the target location can be a pick-up site or a home base 150. A back-end charger management application 114 can automatically determine the target location to instruct the robotic charging system 118 to navigate to a pick-up site or home base 150 for recharging or servicing.

At item 1715, the robotic charging system 118 tracks an instant location. For example, the robotic charging system 118 can receive location coordinates using a built-in location module 344. The instant location refers to the location of the robotic charging system 118 with respect to a coordinate system (e.g., GPS coordinates, longitude/latitude, etc.) The instant location can be reported by the robotic charging system 118 to the computing system 110 so that the computing system 110 can track the location of the robotic charging system 118.

At item 1720, the robotic charging system 118 generates sensor data. For example, one or more sensors can generate sensor data indicating a distance or proximity to an object with respect to the robotic charging system 118. The robotic charging system 118 can build a map of the surroundings of the robotic charging system 118. This allows the robotic charging system 118 to assess the terrain and determine whether there are walls or other objects near the robotic charging system 118. This allows the robotic charging system 118 to chart a course towards the target location.

At item 1725, the robotic charging system 118 navigates towards the target location. The robotic charging system 118 can generate and transmit control signals to a motor to navigate the apparatus to the target location based on the sensor data and the instant location. In addition, a camera can provide image data that is analyzed using image recognition processes to assist in navigation. For example, the robotic charging system 118 can use the image data to determine whether is near an electric vehicle or user. The robotic charging system 118 can use image recognition to identify the user who submitted a request to charge the electric vehicle.

At item 1730, the robotic charging system 118 checks it has arrived at the target location. If not, the robotic charging system 118 continues to track its instant location, generate sensor data indicating its nearby environment, and generate control signals to navigate the robotic charging system 118 towards the target location.

Upon reaching the target location, the robotic charging system 118 can transmit a notification to the server-side application 112. The notification can indicate that the robotic charging system 118 has reached the target destination. The server-side application 112 can transmit a notification to the client-side application 164 (e.g., a push notification) to alert the user that the robotic charging system 118 has arrived and responded to the request to charge the electric vehicle.

The robotic charging system 118 can wait until the user couples the plug 212 into the vehicle's charge port. In other embodiments, the robotic charging system 118 can obtain image data from the camera to locate the vehicle's charge port and activate a robotic arm 602 to position the plug near the vehicle's charge port.

At item 1735, the robotic charging system 118 determines a charge status. The charge status can be "ready for charging," "charging in progress," "charging complete," "charging error," etc. The charge status indicates the states of the charger of the robotic charging system 118. For example, if the robotic charging system 118 is unplugged but ready for charging, the robotic charging system 118 can indicate a "ready for charging" status. Upon plugging the plug 212 of the robotic charging system 118 into the vehicle's charge port, the charge status can be "charging in progress."

At item 1740, the robotic charging system 118 transmits the charge status. For example, the robotic charging system 118 can transmit the charge status to the computing system 110 and/or the client-side application 164. The charge status can be transmitted in response to a change in the charge status.

At item 1745, the robotic charging system 118 checks if charging is complete. If not, the robotic charging system 118 continues to monitor the charging status and report it to a remote system (e.g., computing system or client device 160).

At item 1750, upon charging being complete, the plug 212 can automatically disengage and the cable 215 can automatically recoil. In this respect, the robotic charging system 118 automatically decouples from the electronic vehicle in response to charging being complete and automatically recoiling a cable coupled to the plug after the plug is decoupled.

Upon completion of charging the vehicle the robotic charging system 118 can receive an additional target location to continue servicing electric vehicles or can be directed to a home base or pick-up side for recharging the robotic charging system 118.

Although components described herein can be embodied in software or code executed by hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above show the functionality and operation of an implementation of components within a robotic charging system 118. If embodied in software, each box can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system, such as a processor 310 in a computer system or other system. The machine code can be converted from the source code, etc. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more boxes can be scrambled relative to the order shown. Also, two or more boxes shown in succession can be executed concurrently or with partial concurrence. Further, in some embodiments, one or more of the boxes can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart can also comprise software or code that can be embodied in any non-transitory computer-readable medium for use by or in connection with an instruction execution system such as, for example, a processor 310 in the robotic charging system 118. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any program or application described herein, can be implemented and structured in a variety of ways. For example, one or more applications described can be implemented as modules or components of a single application. Further, one or more applications described herein can be executed in shared or separate computing devices or a combination thereof. Additionally, it is understood that terms such as "application," "service," "system," "module," and so on can be interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure.

What is claimed is:

1. An apparatus comprising:
    a battery or other power source;
    a plug configured to couple to an electric vehicle for charging the electric vehicle;
    a motor configured to drive a plurality of wheels of the apparatus;
    a global positioning system configured to determine a current location associated with the apparatus;
    a sensor configured to generate sensor data indicating a distance between an object and the apparatus;
    a processor configured to:
        receive a target location via a wireless network;
        construct a map of an area surrounding the apparatus comprising terrain information;
        generate a path to the target location based on the map;
        generate and transmit control signals to the motor to navigate the apparatus to the target location based on the sensor data and the current location; and
        in response to charging the electric vehicle, transmit a charge status to a computing system via the communication module; and
    a light emitting component configured to shine infrared light on an area surrounding the apparatus,
    wherein the sensor comprises an infrared cut-off filter,
    wherein the sensor data is generated based in part on infrared light detected by the sensor, and
    wherein the processor is further configured to:
        determine a low level of ambient light is present in the area surrounding the apparatus;
        in response to the determined low level of ambient light, activate the light emitting component to cause the light emitting component to emit infrared light; and
        in response to the determined low level of ambient light, cause the sensor to activate the infrared cut-off filter.

2. The apparatus of claim 1, further comprising:
    a camera configured to receive image data; and
    wherein the processor is further configured to classify the image data, and
    wherein the control signals are further based on the classified image data.

3. The apparatus of claim 1, further comprising:
    a storage device configured to store predefined image data; and
    a display configured to display the predefined image data.

4. The apparatus of claim 3, wherein the predefined image data is advertising content.

5. The apparatus of claim 1, wherein the plurality of wheels comprise a continuous track.

6. The apparatus of claim 1, further comprising a cable reel to house at least a portion of a cable, wherein an end of the cable is coupled to the plug.

7. The apparatus of claim 1, wherein the plug is configured to couple to an inductive charging platform, the inductive charging platform being configured to inductively couple to the electric vehicle.

8. The apparatus of claim 1, further comprising a port configured to couple to a second apparatus in a daisy chain configuration.

9. The apparatus of claim 1, wherein:
    the plug is configured to automatically decouple from the electric vehicle in response to charging being complete, and
    a cable attached to the plug is configured to automatically recoil after the plug is decoupled.

10. The apparatus of claim 1, wherein:
    the target location is generated at a client device, and
    the computing system is configured to receive the target location from the client device.

11. The apparatus of claim 1 further comprising an image sensor, wherein the image sensor generates image data, and wherein the processor is further configured to:
    identify a charging port location of the electric vehicle based on the image data, wherein a charging port of the electric vehicle is located at the charging port location; and
    generate and transmit control signals to couple the plug to the charging port based on the identified charging port location.

12. A method comprising:
    receiving, by a mobile charging apparatus, a target location from a computing system via a wireless network;
    receiving, by the mobile charging apparatus, a current location from a location module;
    determining, by a processor comprising a sensor comprising an infrared cut-off filter, if a low level of ambient light is present in an area surrounding the apparatus;
    activating a light emitting component to cause the light emitting component to emit infrared light in response to the determined low level of ambient light;
    causing the sensor to activate the infrared cut-off filter in response to the determined low level of ambient light;
    generating, by the mobile charging apparatus, sensor data, based in part on infrared light detected by the sensor, indicating a proximity between an object and the mobile charging apparatus;
    constructing a map of an area surrounding the apparatus comprising terrain information;
    generating a path to the target location based on the map;
    generating, by the mobile charging apparatus, control signals based on the current location and sensor data, wherein the control signals navigate the mobile charging apparatus towards the target location;
    coupling a plug of the mobile charging apparatus to an electric vehicle to charge the electric vehicle;
    determining, by the mobile charging apparatus, a charge status of the electric vehicle; and
    transmitting, by the mobile charging apparatus, the charge status to a client device via the wireless network.

13. The method of claim 12, wherein the sensor data comprises image data, the method further comprising:
    classifying the image data by a computer vision module of the mobile charging apparatus,
    wherein the control signals are further based on the classified image data.

14. The method of claim 12, further comprising:
    storing, by the mobile charging apparatus, predefined image data; and
    displaying, by the mobile charging apparatus, the predefined image data.

15. The method of claim 14, wherein the predefined image data is advertising content.

16. The method of claim 12, wherein the mobile charging apparatus comprises a plurality of wheels and a continuous track configured to cause the mobile charging apparatus to move.

17. The method of claim 12, further comprising a cable reel to house at least a portion of a cable, wherein an end of the cable is coupled to the plug.

18. The method of claim 12, further comprising:
coupling the plug to an inductive charging platform, the inductive charging platform configured to inductively couple to the electric vehicle.

19. The method of claim 12, further comprising:
coupling the mobile charging apparatus to a second mobile charging apparatus in a daisy chain configuration.

20. The method of claim 12, further comprising:
automatically decoupling from the electric vehicle in response to charging being complete; and
automatically recoiling a cable coupled to the plug after the plug is decoupled.

21. The method of claim 12, wherein the target location is generated at a client device that communicates the target location to the computing system.

\* \* \* \* \*